(12) United States Patent
Huang

(10) Patent No.: US 11,356,583 B2
(45) Date of Patent: Jun. 7, 2022

(54) IMAGE CAPTURING APPARATUS, ELECTRONIC EQUIPMENT AND TERMINAL

(71) Applicant: Shanghai Harvest Intelligence Technology Co., Ltd., Shanghai (CN)

(72) Inventor: Jiandong Huang, Shanghai (CN)

(73) Assignee: SHANGHAI HARVEST INTELLIGENCE TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/894,711

(22) Filed: Jun. 5, 2020

(65) Prior Publication Data
US 2021/0058534 A1 Feb. 25, 2021

(30) Foreign Application Priority Data

Jun. 5, 2019 (CN) .................. 201910488791.X
Jun. 5, 2019 (CN) .................. 201910495911.9
(Continued)

(51) Int. Cl.
*H04N 5/225* (2006.01)
*G02B 5/10* (2006.01)
(Continued)

(52) U.S. Cl.
CPC .......... *H04N 5/2253* (2013.01); *G02B 5/003* (2013.01); *G02B 5/10* (2013.01); *G02B 17/08* (2013.01);
(Continued)

(58) Field of Classification Search
CPC combination set(s) only.
See application file for complete search history.

(56) References Cited

U.S. PATENT DOCUMENTS 10,083,335 B2 9/2018 Zhang
10,290,257 B1 * 5/2019 Slobodin .......... H01L 27/14605
(Continued)

FOREIGN PATENT DOCUMENTS

CN 104182727 A 12/2014
CN 105699296 A 6/2016
(Continued)

OTHER PUBLICATIONS

First Chinese Office Action regarding Application No. 202010490035.3 dated Jul. 1, 2021. English translation provided by Unitalen Attorneys at Law.
(Continued)

*Primary Examiner* — Md N Haque
(74) *Attorney, Agent, or Firm* — Harness, Dickey & Pierce, P.L.C.

(57) ABSTRACT

The present disclosure provides an image capturing apparatus, an electronic equipment, and a terminal. The image capturing includes: a light-transmitting cover plate; a light source module disposed below a first surface of the light-transmitting cover plate; at least one sensing module including a mask layer and a sensor component, wherein the sensor component has a first surface and a second surface opposite to each other, the first surface of the sensor component is disposed opposite to the mask layer and the second surface of the sensor component is a photosensitive surface, and the mask layer is made of an opaque material; a catadioptric component having a first surface and a second surface opposite to each other, wherein the sensor component is disposed on the first surface of the catadioptric component. With technical solution of the present disclosure, the imaging effect of the image capturing apparatus can be improved.

29 Claims, 13 Drawing Sheets

(30) Foreign Application Priority Data

| | | | |
|---|---|---|---|
| Jun. 5, 2019 | (CN) | ......................... | 201910495912.3 |
| Jun. 2, 2020 | (CN) | ......................... | 202010490035.3 |
| Jun. 2, 2020 | (CN) | ......................... | 202010490037.2 |
| Jun. 2, 2020 | (CN) | ......................... | 202010490972.9 |

(51) Int. Cl.
*G02B 17/08* (2006.01)
*G02B 5/00* (2006.01)

(52) U.S. Cl.
CPC ......... *H04N 5/2254* (2013.01); *H04N 5/2256* (2013.01); *H04N 5/2258* (2013.01)

(56) References Cited

U.S. PATENT DOCUMENTS

| | | | |
|---|---|---|---|
| 2004/0263660 A1 | 12/2004 | Wang et al. | |
| 2008/0208499 A1* | 8/2008 | Miyashita | G03F 7/706 702/82 |
| 2015/0334279 A1* | 11/2015 | Barrows | H01L 27/14685 438/65 |
| 2017/0193270 A1 | 7/2017 | Zhang | |
| 2017/0243373 A1* | 8/2017 | Bevensee | G01S 17/08 |
| 2018/0012069 A1* | 1/2018 | Chung | G06K 9/2036 |
| 2018/0041672 A1* | 2/2018 | Yu | H04N 5/2256 |
| 2018/0077322 A1* | 3/2018 | Melakari | H04N 5/23229 |
| 2020/0127066 A1 | 4/2020 | Zhang et al. | |

FOREIGN PATENT DOCUMENTS

| | | |
|---|---|---|
| CN | 106446860 A | 2/2017 |
| CN | 107451518 A | 12/2017 |
| CN | 107679486 A | 2/2018 |
| CN | 108241820 A | 7/2018 |
| CN | 108258017 A | 7/2018 |
| CN | 108493215 A | 9/2018 |
| CN | 108695345 A | 10/2018 |
| CN | 109417591 A | 3/2019 |
| CN | 109584741 A | 4/2019 |
| CN | 109713003 A | 5/2019 |

OTHER PUBLICATIONS

First Chinese Office Action regarding Application No. 202010490037.2 dated Jul. 1, 2021. English translation provided by Unitalen Attorneys at Law.

* cited by examiner

IMAGE CAPTURING APPARATUS, ELECTRONIC EQUIPMENT AND TERMINAL

CROSS-REFERENCE TO RELATED APPLICATIONS

The present application claims the benefit of priority to Chinese patent application No. 202010490035.3, filed on Jun. 2, 2020, entitled "Image Capturing Apparatus and Electronic Equipment", the entire disclosures of which are incorporated herein by reference.

The present application claims the benefit of priority to Chinese patent application No. 202010490037.2, filed on Jun. 2, 2020, entitled "Image Capturing Apparatus and Electronic Equipment", the entire disclosures of which are incorporated herein by reference.

The present application claims the benefit of priority to Chinese patent application No. 202010490972.9, filed on Jun. 2, 2020, entitled "Light Detecting Structure, Fingerprint Module and Terminal", the entire disclosures of which are incorporated herein by reference.

The present application claims the benefit of priority to Chinese patent application No. 201910488791.X, filed on Jun. 5, 2019, entitled "Image Capturing Apparatus and Electronic Equipment", the entire disclosures of which are incorporated herein by reference.

The present application claims the benefit of priority to Chinese patent application No. 201910495911.9, filed on Jun. 5, 2019, entitled "Image Capturing Apparatus and Electronic Equipment", the entire disclosures of which are incorporated herein by reference.

The present application claims the benefit of priority to Chinese patent application No. 201910495912.3, filed on Jun. 5, 2019, entitled "Light Detecting Structure, Fingerprint Module and Terminal", the entire disclosures of which are incorporated herein by reference.

TECHNICAL FIELD

The present disclosure relates to the technical field of optical devices, and more particular to an image capturing apparatus, an electronic equipment and a terminal.

BACKGROUND

In existing electronic equipments, such as mobile phone screens, virtual reality glasses, etc., objects in front of the screens, such as fingerprints, eyes, or fingers, need to be imaged and positioned to better display screen images.

In conventional technologies, optical imaging has become a mainstream technical solution. However, in the existing image capturing apparatus or methods, stray light such as ambient light is normally transmitted through components of the image capturing apparatus and received by an optical sensor, which forms large background signal of the signal light captured from the object to be imaged, which affects the imaging effect.

As shown in FIG. 1, an image capturing apparatus includes a light-transmitting cover plate 101, a light source module 102, a lens 103 and a sensor component 104. Light L2 emitted from the light source module 102 may be reflected by the light-transmitting cover plate 101, transmitted through the lens 103 and received by the sensor component 104. Stray light such as ambient light L1 is also transmitted through the light-transmitting cover plate 101, the light source module 102, and the lens 103, and is received by the sensor component 104, which affects the imaging effect.

SUMMARY

Embodiments of the present disclosure provide an image capturing apparatus, which can effectively suppress the ambient light and improve the imaging effect of the image capturing apparatus.

An embodiment of the present disclosure provides an image capturing apparatus, including: a light-transmitting cover plate; a light source module disposed below a first surface of the light-transmitting cover plate; at least one sensing module including a mask layer and a sensor component, wherein the sensor component has a first surface and a second surface opposite to each other, the first surface of the sensor component is disposed opposite to the mask layer and the second surface of the sensor component is a photosensitive surface, and the mask layer is made of an opaque material; a catadioptric component having a first surface and a second surface opposite to each other, wherein the sensor component is disposed on the first surface of the catadioptric component; wherein a first incident light generated by the light source module is reflected to the second surface of the catadioptric component by the first surface of the light-transmitting cover plate, refracted and reflected on the second surface of the catadioptric component, and received by the second surface of the sensor component.

In some embodiments, an incident angle of the first incident light on the first surface of the light-transmitting cover plate is greater than a critical angle of total reflection.

In some embodiments, a portion of a second incident light generated by the light source module, which is reflected by the first surface of the light-transmitting cover plate, is transmitted through the second surface of the catadioptric component or shielded by the mask layer, and an incident angle of the second incident light on the first surface of the light-transmitting cover plate is less than a critical angle of total reflection.

In some embodiments, an ambient light, which is transmitted through the light-transmitting cover plate, is transmitted through the second surface of the catadioptric component or shielded by the mask layer.

In some embodiments, the image capturing apparatus further includes: a protective layer disposed below the light source module.

In some embodiments, the image capturing apparatus includes a plurality of discrete sensing modules, an opening is disposed in an area between each two adjacent sensing modules, or an area between each two adjacent sensing modules is light-transmitting.

In some embodiments, an area of the mask layer in each sensing module is greater than or equal to an area of the sensor component.

In some embodiments, the catadioptric component includes a substrate.

In some embodiments, the catadioptric component further includes: an optical element disposed below the substrate; wherein light scattered by an object to be captured reaches the optical element through an area between two adjacent sensing modules, and is reflected by the optical element and received by the second surface of the sensor component.

In some embodiments, the catadioptric component includes an optical element disposed below the second surface of the sensor component; wherein light scattered by an object to be captured reaches the optical element through an area between two adjacent sensing modules, and is reflected by the optical element and received by the second surface of the sensor component.

In some embodiments, the object to be captured is imaged by the optical element onto the sensor component according to geometric optical principle.

In some embodiments, the optical element includes a first optical element and a second optical element, and the first optical element and the second optical element are disposed in parallel along a surface direction of the sensor component.

In some embodiments, the light source module includes a first light source area and a second light source area, the sensor component includes a first sensor area and a second sensor area, the first sensor area is disposed opposite to the first light source area, and the second sensor area is disposed opposite to the second light source area, the first optical element is disposed opposite to the first sensor area, and the second optical element is disposed opposite to the second sensor area.

In some embodiments, the image capturing apparatus further includes a third optical element and a fourth optical element; wherein the third optical element and the fourth optical element are disposed on one side of the light source module far away from the sensor component, the light scattered by the object to be captured reaches the first optical element through the third optical element, and the light scattered by the object to be captured reaches the second optical element through the fourth optical element.

In some embodiments, the optical element includes a concave mirror, and the object to be captured above the light source module is imaged by the concave mirror onto the sensor component according to geometric optical principle.

In some embodiments, the first surface of the sensor component is attached to the light source module.

In some embodiments, the object to be captured is not in contact with the light source module.

In some embodiments, the object to be captured includes a fingerprint, an eyeball, a gesture, or a human face.

In some embodiments, the light source module includes a display structure.

In some embodiments, the light source module is selected from a liquid crystal display screen, an organic light emitting diode display screen, and a micro light emitting diode display screen.

In some embodiments, the second surface of the sensor component includes a photosensitive pixel array.

In some embodiments, the catadioptric component, the photosensitive pixel array above the catadioptric component, and the mask layer above the photosensitive pixel array constitute a light detecting structure; the mask layer in the light detecting structure includes a first mask layer above the photosensitive pixel array and a second mask layer above the first mask layer from bottom to top; the first mask layer includes a plurality of first light-shielding portions, and a first light-transmitting portion is disposed between adjacent first light-shielding portions; and the second mask layer includes a plurality of second light-shielding portions, and a second light-transmitting portion is disposed between adjacent second light-shielding portions; wherein there is a one-to-one correspondence between the plurality of second light-shielding portions and the first light-transmitting portion, and each second light-shielding portion is disposed above a corresponding first light-transmitting portion.

In some embodiments, a third incident light is radiated to the corresponding first light-transmitting portion along an edge of each second light-shielding portion with a critical angle of total reflection as an incident angle, and an intersection point is located on an edge of the corresponding first light-transmitting portion or outside the corresponding first light-transmitting portion when the third incident light intersects with the first mask layer.

In some embodiments, when the third incident light intersects with the first mask layer, a radius of a projection of each second light-shielding portion on the first mask layer is less than or equal to a product of a tangent value of the critical angle of total reflection and a thickness value of the mask layer.

In some embodiments, the second light-shielding portion and the first light-transmitting portion are both circular-shaped, and a connecting line between a center of circle of the second light-shielding portion and a center of circle of the corresponding first light-transmitting portion is perpendicular to a plane where the second light-shielding portion and the corresponding first light-transmitting portion are located.

In some embodiments, a difference between a radius of the second light-shielding portion and a radius of the corresponding first light-transmitting portion is equal to a product of the tangent value of the critical angle of total reflection and the thickness value of the mask layer.

In some embodiments, the photosensitive pixel array includes a plurality of photodiodes arranged in an array.

In some embodiments, the plurality of second light-shielding portions are arranged in a hexagonal array.

In some embodiments, the plurality of second light-shielding portions are arranged in a strip array.

In some embodiments, the light source module includes an OLED display structure.

In some embodiments, a signal light emitted by the OLED display structure includes light having an incident angle on the first mask layer greater than the critical angle of total reflection.

In some embodiments, the mask layer includes an electrode.

In some embodiments, the image capturing apparatus further includes: a complementary metal oxide semiconductor device disposed below the substrate; and a lens disposed between the substrate and the complementary metal oxide semiconductor device, wherein light scattered by an object to be captured is transmitted through the lens and received by the complementary metal oxide semiconductor device.

In some embodiments, both the light source module and the at least one sensing module are attached to the second surface of the light-transmitting cover plate.

In some embodiments, the light-transmitting cover plate includes a plurality of display pixels, and the light source module is disposed below the light-transmitting cover plate.

Another embodiment of the present disclosure provides an electronic equipment, including: the image capturing apparatus according to some embodiment of the present disclosure; and a processor coupled with the image capturing apparatus and configured to process an image of an object to be captured by the image capturing apparatus.

Another embodiment of the present disclosure provides a terminal, including the image capturing apparatus according to some embodiment of the present disclosure.

Compared with conventional technologies, embodiments of the present disclosure have following beneficial effects.

Embodiments of the present disclosure provide an image capturing apparatus, including: a light-transmitting cover plate; a light source module disposed below a first surface of the light-transmitting cover plate; at least one sensing module including a mask layer and a sensor component, wherein the sensor component has a first surface and a second surface opposite to each other, the first surface of the sensor component is disposed opposite to the mask layer and the second surface of the sensor component is a photosensitive surface, and the mask layer made of an opaque material; a catadioptric component having a first surface and a second surface opposite to each other, wherein the sensor component is disposed on the first surface of the catadioptric component; wherein a first incident light generated by the light source module is reflected to the second surface of the catadioptric component by the first surface of the light-transmitting cover plate, refracted and reflected on the second surface of the catadioptric component, and received by the second surface of the sensor component. In some embodiments of the present disclosure, by setting the photosensitive surface of the sensor component to face downward, that is, the first surface of the sensor component is disposed opposite to the mask layer, and the second surface of the sensor component is the photosensitive surface, a first incident light (that is, an effective light signal) generated by the light source module may be refracted and reflected by the first surface of the light-transmitting cover plate, and then refracted and reflected by the second surface of the catadioptric component, and received by the second surface of the sensor component. In combination with the mask layer, vertical incident light generated by the light source module and ambient light may be transmitted out through the catadioptric component or shielded by the mask layer, so that the effective light signal can be received by the sensor component, and the stray light can be effectively suppressed, thereby improving signal-to-noise ratio of final imaging and improving the imaging efficiency. In addition, by setting the photosensitive surface of the sensor component to face downward, a cable connection and attachment is possible between the light source module and the sensor component, the inconvenience of testing the sensor component caused by the shielding of the light source module in the conventional technologies can be avoided, and a photoelectric test can be carried out directly from a lower surface of the catadioptric component, which is convenient for testing the sensor component.

Further, the image capturing apparatus includes an optical element disposed below the second surface of the sensor component; wherein the light scattered by an object to be captured is reflected by the optical element and received by the second surface of the sensor component. In some embodiments of the present disclosure, by providing the optical element, far-field imaging, such as face recognition, and near-field imaging or mid-field imaging, such as suspending fingerprint recognition, can also be achieved. In addition, near-field imaging and far-field imaging can share the sensor component without an additional complementary metal oxide semiconductor, thereby reducing the number of components and costs and reducing overall thickness of the apparatus.

Further, the mask layer is an electrode. In some embodiments of the present disclosure, by configuring the mask layer as an electrode, an integrated structure of the light source module and the sensor component can be achieved, thus the light source module and the sensor component can be formed at one time in the process, thereby avoiding separate formation of the light source module and the sensor component in the conventional technologies, and reducing the complexity of the process.

Further, the image capturing apparatus includes an optical element, wherein the optical element is disposed opposite to the second surface of the sensor component, and the light emitted from the light source module is scattered to the optical element through the object to be captured, reflected by the optical element and received by the second surface of the sensor component. The second surface of the sensor component is suitable for receiving the light scattered by the object to be captured, and performing photoelectric conversion, so as to realize image capturing and avoid the use of an additional camera device. Further, with the reflecting and refracting of an optical path between the optical element and the sensor component, the thickness of the device is reduced by about half, thereby reducing the cost.

Further, the image capturing apparatus includes two optical elements, and the two optical elements are disposed in parallel below the second surface of the sensor component. In some embodiments of the present disclosure, by providing two optical elements, the object to be captured can be imaged at a certain distance at different positions of the sensor component, so that three-dimensional imaging can be formed and the object to be captured can be positioned.

Further, the image capturing apparatus includes a third optical element and a fourth optical element, and the third optical element and the fourth optical element are disposed above the light source module. The light scattered by the object to be captured is refracted by the third optical element, and then transmitted through the light source module and the sensor component to the first optical element. The light scattered by the object to be captured is refracted by the fourth optical element, and then transmitted through the light source module and the sensor component to the second optical element. By providing the third optical element and the fourth optical element according to some embodiments of the present disclosure, the object to be captured can be imaged onto the photosensitive surface of the sensor component when a distance between the object to be captured and the light source module is relatively small.

Further, the incident angle of refracted light radiated on the first mask layer is less than the critical angle of total reflection when the ambient light is incident from the air with low refractive index. By setting a third incident light with the critical angle of total reflection as the incident angle radiated to the corresponding first light-transmitting portion along the edge of the second light-shielding portion, when intersecting with the corresponding first light-transmitting portion, the intersection point may be located on the edge of the corresponding first light-transmitting portion or outside the corresponding first light-transmitting portion, thus the refracted light of the ambient light is mostly incident outside the first light-transmitting portion, so that the light detecting structure can suppress almost all ambient light.

Further, by controlling an angle value of the incident angle of the light emitted from the OLED array to be greater than the critical angle of total reflection, the light emitted from the OLED array can be incident to the first light-transmitting portion of the first mask layer as much as possible, thereby improving light efficiency of a fingerprint module.

DETAILED DESCRIPTION

As described in the background art, in existing image capturing apparatus, stray light such as ambient light L1 is usually transmitted through the light-transmitting cover plate 101, the light source module 102, and the lens 103 to the sensor component 104, which affects the imaging effect.

In some embodiments of the present disclosure, by setting the photosensitive surface of the sensor component to face downward, that is, the first surface of the sensor component is disposed opposite to the mask layer, and the second surface of the sensor component is the photosensitive surface, a first incident light (that is, an effective light signal) generated by the light source module may be refracted and reflected by the first surface of the light-transmitting cover plate, and then refracted and reflected by the second surface of the catadioptric component, and received by the second surface of the sensor component. In combination with the mask layer, vertical incident light generated by the light source module and ambient light may be transmitted out through the catadioptric component or shielded by the mask layer, so that the effective light signal can be received by the sensor component, and the stray light can be effectively suppressed, thereby improving signal-to-noise ratio of final imaging and improving the imaging efficiency.

In order to make above objects, features and advantages of the present disclosure more obvious and understandable, specific embodiments of the present disclosure will be described in detail below with reference to the accompanying drawings.

Figure 1:
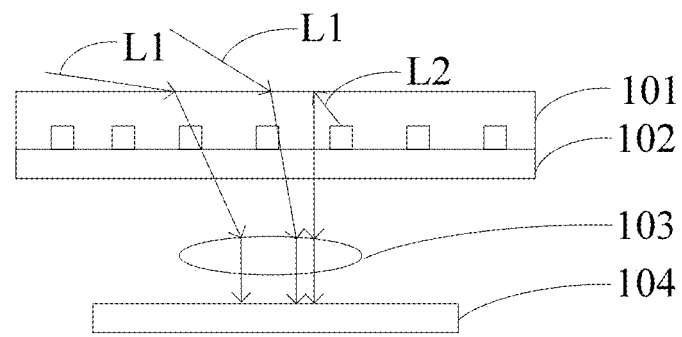
FIG. 1 is a schematic structural view of an image capturing apparatus in the prior art.
Figure 2:
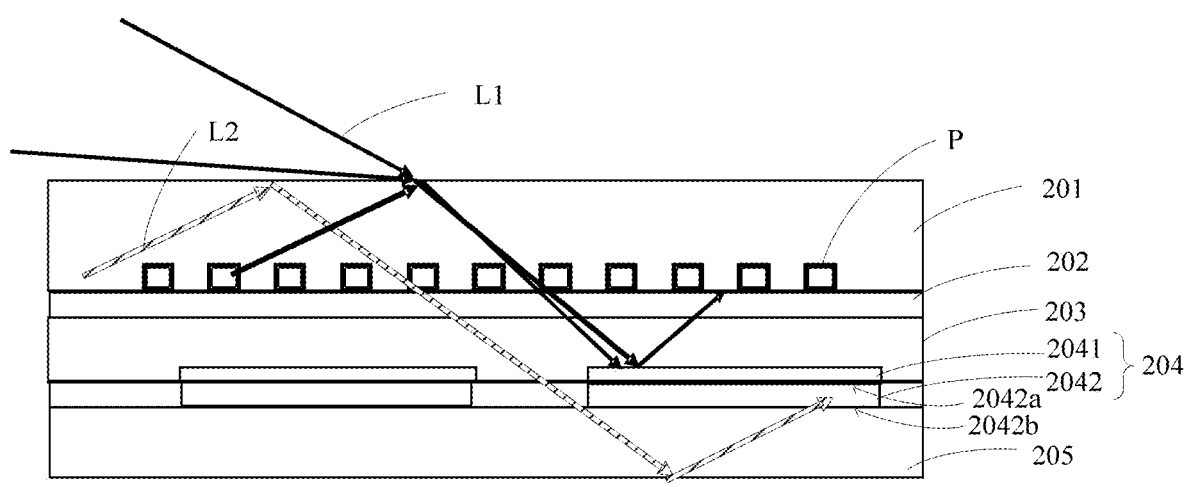
FIG. 2 is a schematic structural view of an image capturing apparatus according to an embodiment of the present disclosure.

FIG. 2 is a schematic structural view of an image capturing apparatus according to an embodiment of the present disclosure.

This embodiment may be applied to fingerprint collection scenes, and may also be used in scenarios such as suspending fingerprint imaging and face imaging.

Specifically, in some embodiments, the image capturing apparatus may include a light-transmitting cover plate 201, a light source module 202, a protective layer 203, a sensing module 204, and a catadioptric component from top to bottom. In a specific implementation, the catadioptric component includes a substrate.

The light-transmitting cover plate 201 has a first surface and a second surface opposite to each other. The first surface of the light-transmitting cover plate 201 may be in contact with an object to be captured (not shown). For example, the object to be captured may be a finger.

In some embodiments, the light-transmitting cover plate 201 may be a single-layer structure or a multi-layer structure. The single-layer structure may be a glass cover plate or an organic light-transmitting material cover plate, or the single-layer structure light-transmitting cover plate 201 may also be a cover plate with other functions, such as a touch screen. The multi-layer structure may be a multi-layer glass cover plate or a multi-layer organic light-transmitting material cover plate or a combination of a glass cover plate and an organic light-transmitting material cover plate.

In some embodiments, the light source module 202 is disposed below a first surface of the light-transmitting cover plate 201.

In some embodiments, the protective layer 203 is disposed below the light source module 202, and the light source module 202 may be attached to the first surface of the light-transmitting cover plate 201, for example, by optical adhesive. Specifically, the protective layer 203 may be glass, optical adhesive, or any other implementable protective material, which is not limited in the embodiments of the present disclosure.

In some embodiments, the light source module 202 may include a plurality of light sources arranged on a substrate, for example, a substrate of an organic light-emitting diode (OLED).

The light source module 202 may have a plurality of light sources, and the light sources may be point light sources, line light sources, or light sources having other topologies.

In some embodiments, the at least one sensing module 204 may include a mask layer 2041 and a sensor component 2042. The sensor component 2042 has a first surface 2042a and a second surface 2042b opposite to each other. The first surface 2042a of the sensor component 2042 is attached to the mask layer 2041, and the second surface 2042b of the sensor component 2042 is a photosensitive surface.

In some embodiments, the sensor component 2042 may be used to obtain light, and may include a plurality of photosensitive units (not shown in the figure).

In some embodiments, the photosensitive surface of the sensor component 2042, that is, the second surface 2042b is facing away from the light source module 202. Therefore, after a reflection on an upper surface of the light-transmitting cover plate 201 and a secondary reflection on a lower surface of the substrate 205, the light generated by the light source module 202 is received by the photosensitive surface of the sensor component 2042.

In addition, the mask layer 2041 is made of a light-shielding material, and thus can shield and suppress stray light such as ambient light. Specifically, a second incident light generated by the light source module 202 is reflected by the first surface of the light-transmitting cover plate 201, and then transmitted through the substrate 205 or shielded by the mask layer 2041. The incident angle between the second incident light and the second surface of the light-transmitting cover plate 201 is less than the critical angle of total reflection, and ambient light is transmitted through the substrate 205 or shielded by the mask layer 2041 after being transmitted through the light-transmitting cover plate 201, and thus cannot be totally reflected on the lower surface of the substrate 205 to enter the photosensitive surface of the sensor component 2042.

In some embodiments, the substrate 205 has a first surface and a second surface opposite to each other. The substrate 205 is disposed below the at least one sensing module 204 for placing the at least one sensing module 204. The substrate 205 may be made of a light-transmitting material.

In some embodiments, by setting the photosensitive surface of the sensor component 2042 to face downward, that is, the first surface of the sensor component 2042 is attached to the mask layer 2041, and the second surface of the sensor component 2042 is the photosensitive surface, the first incident light (that is, an effective light signal) generated by the light source module 202 may be reflected by the first surface of the light-transmitting cover plate 201, and reflected by the second surface of the substrate 205, and received by the second surface of the sensor component 2042. In combination with the mask layer 2041, the second incident light generated by the light source module 202 and ambient light can be transmitted through the substrate 205 or shielded by the mask layer 2041, so that the effective optical signal can be received by the sensor component 2042, and the stray light can be effectively suppressed, thereby improving signal-to-noise ratio of final imaging and improving the imaging efficiency.

In some embodiment, the light source module 202 may be a display structure, such as a liquid crystal display screen, an organic light emitting diode display screen, or a micro light emitting diode display screen. In the embodiment shown in FIG. 2, the light source module 202 may include a substrate (not marked), and display pixels P disposed on the substrate. The light-transmitting cover plate 201 and the light source module 202 form a stacked structure. In some embodiments, the stacked structure further includes a polarizing plate, a quarter-wave plate, and/or a touch screen.

In a non-limiting embodiment, an area between each two adjacent sensing modules 204 (i.e., a gap between the two sensing modules 204) may be light-transmitting. In other words, the light incident on the sensing modules 204 can be shielded by the mask layer 2041, and the light incident on the area between the sensing modules 204 can be transmitted through the area, and is totally reflected on the second surface of the substrate 205 and received by the photosensitive surface of the sensor component 2042, or directly transmitted through the second surface of the substrate 205.

In a non-limiting embodiment, the image capturing apparatus includes a plurality of discrete sensing modules. An opening is disposed in the area between each two adjacent sensing modules 204 or an area between each two adjacent sensing modules is made of a light-transmitting material.

In some embodiments, the light-transmitting effect of the area between the sensing modules 204 may be achieved by means of the opening or the light-transmitting material.

In a non-limiting embodiment, an area of the mask layer 2041 in each sensing module 204 is greater than or equal to an area of the sensor component 2042.

In some embodiments of the present disclosure, by setting the area of the mask layer 2041 to be greater than or equal to the area of the sensor component 2042, it is possible to avoid ineffectiveness shielding of stray light and prevent the stray light from being received by the photosensitive surface of the sensor component 2042.

In some embodiments, the light-transmitting cover plate and the light source module, and/or the light source module and the sensing modules are bonded by optical adhesive.

In a non-limiting embodiment, the catadioptric component includes an optical element 206. The optical element is disposed below the second surface of the substrate 205. The light scattered by the object to be captured passes through the area between two adjacent sensing modules 204 and enters the optical element 206, and is reflected by the optical element and received by the second surface of the sensor component 2042.

Figure 3:
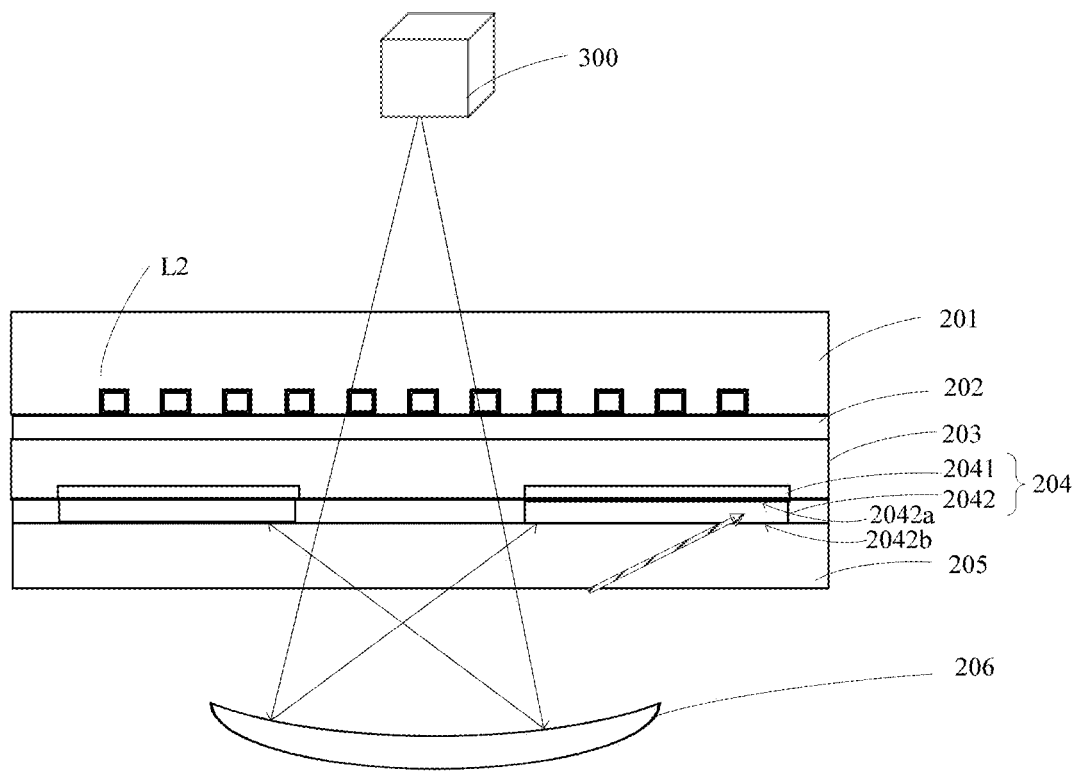
FIG. 3 is a schematic structural view of an image capturing apparatus according to another embodiment of the present disclosure.

In a non-limiting embodiment, referring to FIG. 3. the image capturing apparatus shown in FIG. 3 differs from the image capturing apparatus shown in FIG. 2 in that the catadioptric component further includes an optical element 206. The optical element 206 is disposed below the second surface of the sensor component 2042. Light scattered by an object 300 to be captured reaches the optical element 206 through the area between two adjacent sensing modules 204, and is reflected by the optical element 206 and received by the second surface of the sensor component 2042.

In some embodiments, the optical element 206 may be a concave mirror. The concave mirror is a non-lens.

More specifically, the optical element 206 is disposed below the substrate 205, and a distance between the optical element 206 and the lower surface of the substrate 205 is greater than 0.

Further, the object 300 to be captured is imaged by the optical element 206 onto the sensor component 2042 according to geometric optical principle. In other words, the distance between the optical element 206 and the lower surface of the substrate 205 may be determined according to geometric imaging principle.

For related technical principles of the geometric imaging principle, please refer to existing technologies, which is not limited in the embodiments of the present disclosure.

In some embodiments of the present disclosure, by providing the optical element 206, far-field imaging, such as face recognition, and near-field or mid-field imaging, such as suspending fingerprint recognition, can also be achieved. In addition, near-field imaging and far-field imaging can share the sensor component 2042 without an additional complementary metal oxide semiconductor (CMOS), thereby reducing the number of components and costs and reducing overall thickness of the apparatus.

Figure 4:
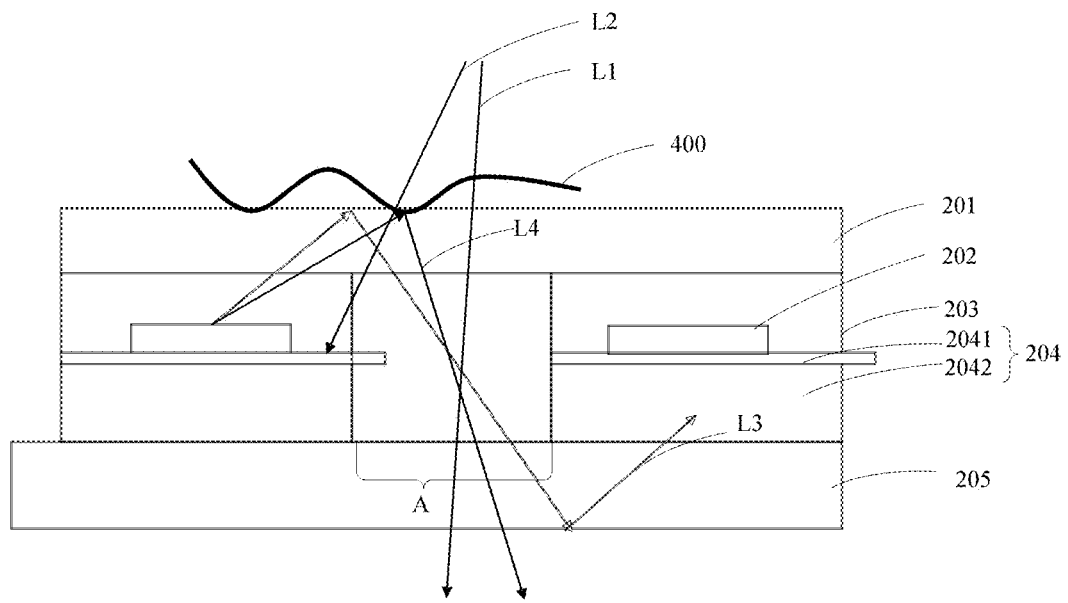
FIG. 4 is a schematic structural view of an image capturing apparatus according to still another embodiment of the present disclosure.

In a non-limiting embodiment, referring to FIG. 4, in the image capturing apparatus shown in FIG. 4, the mask layer 2041 is an electrode, and the light source module 202 may be directly attached to an upper surface of the mask layer 2041.

In some embodiments, the light source module 202 and the sensor component 2042 may be integrated on a same substrate 205. The light source module 202 and the sensor component 2042 may share an electrode (that is, the mask layer 2041).

Specifically, an area A surrounded by the light-transmitting cover 201, the substrate 205, the light source module 202, and the sensing modules 204 may be an area having an opening or a light-transmitting area.

In some embodiments, the object to be captured may be a finger 400.

In some embodiments of the present disclosure, by configuring the mask layer 2041 as an electrode, and directly attaching the light source component 202 to the upper surface of the mask layer 2041, an in-cell structure of the light source module 202 and the sensor component 2042 is achieved (for example, integrated vertically), which can be formed at one time in the process, thereby avoiding separate formation and bonding of the light source module and the sensor component in the conventional technologies, and reducing the complexity of the process.

Figure 5:
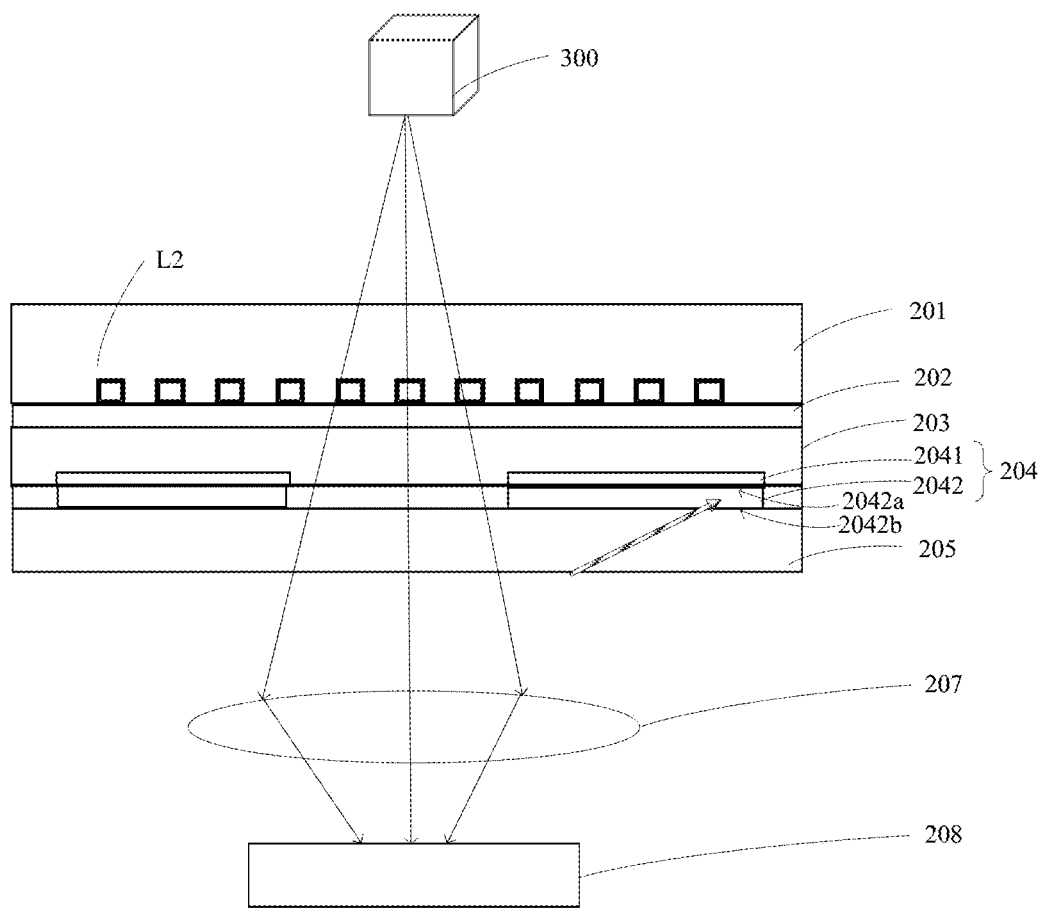
FIG. 5 is a schematic structural view of an image capturing apparatus according to yet another embodiment of the present disclosure.

Referring to FIG. 5, unlike the image capturing apparatus shown in FIG. 3, the image capturing apparatus shown in FIG. 5 includes a complementary metal oxide semiconductor device 208 and a lens 207.

The complementary metal oxide semiconductor device 208 is disposed below the substrate 205.

The lens 207 is disposed between the substrate 205 and the complementary metal oxide semiconductor device 208, and the light scattered by the object 300 to be captured is transmitted through the lens 207 and received by the complementary metal oxide semiconductor device 208.

In some embodiments of the present disclosure, by providing the complementary metal oxide semiconductor device 208 and the lens 207, far-field imaging, such as face recognition, and near-field or mid-field imaging, such as suspending fingerprint recognition, can also be achieved. In addition, near field imaging and far field imaging may share the sensor component 2042, thereby reducing the number of components and costs and reducing overall thickness of the apparatus.

In addition, the complementary metal oxide semiconductor device 208 can also achieve high pixel imaging effect to meet high-resolution imaging requirements.

Another embodiment of the present disclosure also provides an electronic equipment. The electronic equipment may include the image capturing apparatus shown in FIGS. 2 to 5, and a processor coupled with image capturing apparatus and configured to receive the image of the object captured by the image capturing apparatus.

Figure 6:
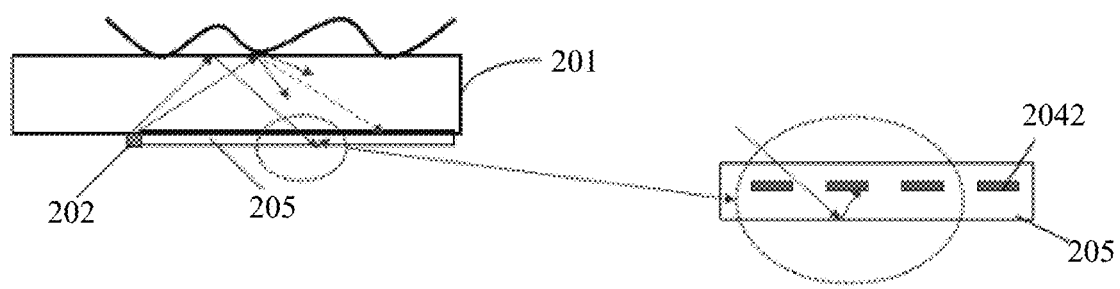
FIG. 6 is a schematic structural view of an image capturing apparatus according to yet another embodiment of the present disclosure.

FIG. 6 is a schematic structural view of an image capturing apparatus according to another embodiment of the present disclosure. The image capturing apparatus includes a light-transmitting cover plate 201, a light source module 202 and a substrate 205. The substrate 205 includes at least one sensor component 2042. The sensor component 2042 may be a photosensitive unit, and the light-transmission cover plate 201 includes a display layer, such as an OLED layer. The light source module 202 is disposed on one side of the substrate 205 and below the light-transmitting cover plate 201. In this embodiment, a second surface of the sensor component 2042, that is, the photosensitive side, faces downward. It can be seen from a right enlarged view in FIG. 6 that the light emitted from the light source module 202 is scattered by the object to be captured and incident to the lower surface of the substrate 205, and then reflected by the lower surface of the substrate 205, and received by the second side of the sensor component 2042. In some embodiments, the light source module 202 and the light-transmitting cover plate 201 may be bonded by optical adhesive, and the substrate 205 and the light-transmitting cover plate 201 may be bonded by optical adhesive. The optical adhesive is transparent.

Figure 7:
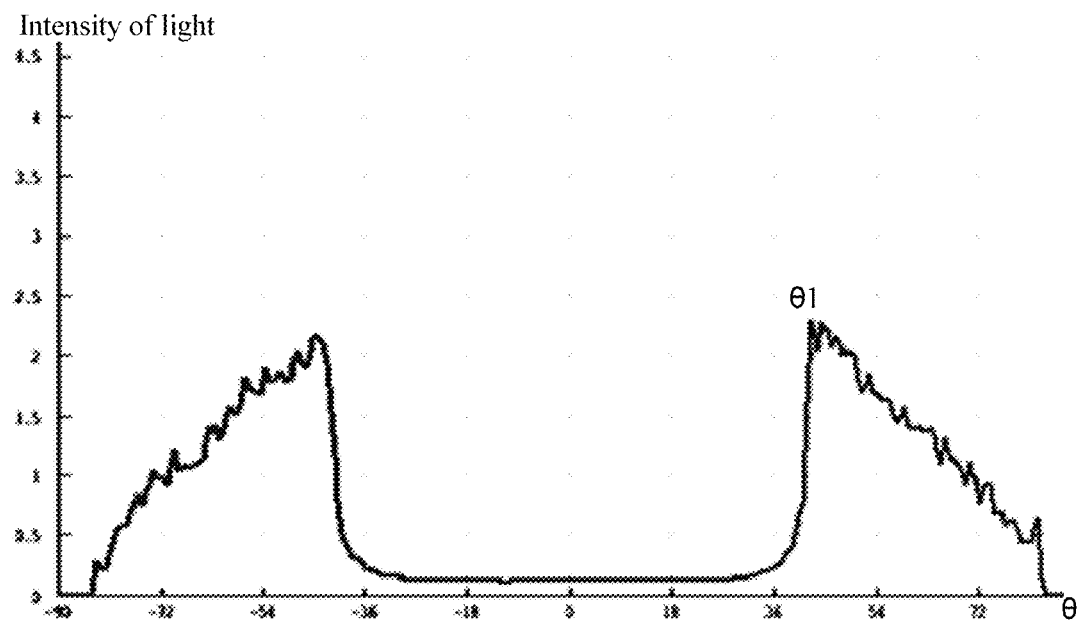
FIG. 7 is a schematic view showing an angular distribution of signal light and ambient light collected by the image capturing apparatus according to the embodiments shown in FIGS. 2 to 6 of the present disclosure.
Figure 7:
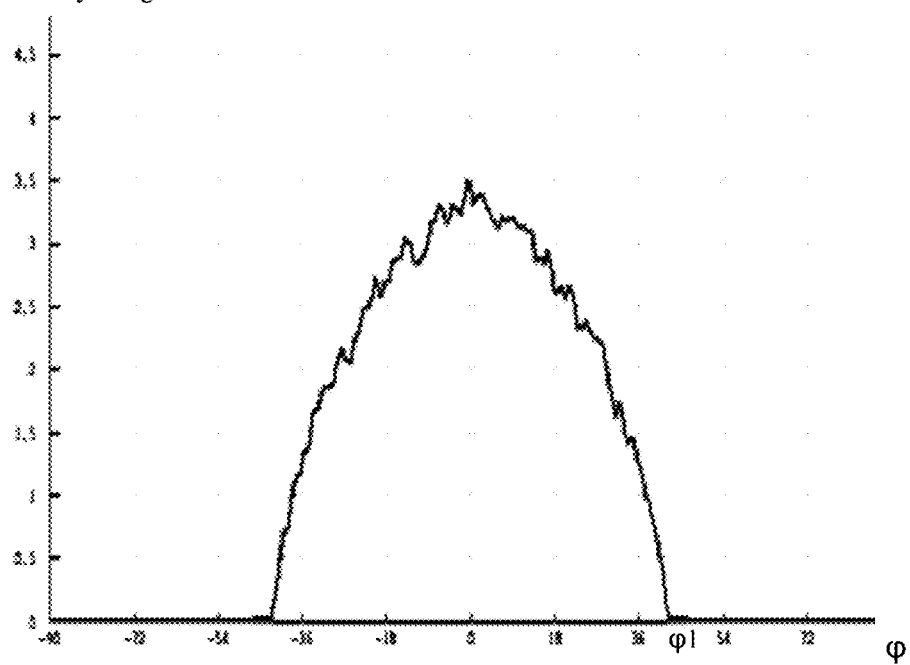

FIG. 7 is a schematic view showing an angular distribution of signal light and ambient light collected by the image capturing apparatus according to the embodiments shown in FIGS. 2 to 5 of the present disclosure. As can be seen from an upper figure in FIG. 7 that the signal light has light intensity distribution within a certain angle range of $\theta 1 < \theta < 90°$, and the maximum light intensity is at $\theta = \theta 1$. With the increase of $\theta$, the intensity of the signal light gradually decreases. As can be seen from a lower figure in FIG. 7, the ambient light has a light intensity distribution within a certain angle range of $0° < \varphi < \varphi 1$, and the maximum light intensity is at $0°$. With the increase of angle, the ambient light weakens, and the signal light and the ambient light have their respective angle orthogonal of light intensity distribution. In some embodiments, critical angle $\theta 1 = \varphi 1$, and the value of the critical angle is related to the refractive index of a medium on both sides of total reflection interface. For example, in some embodiments, $\theta 1$ and $\varphi 1$ are approximately 42 degrees.

Figure 8:
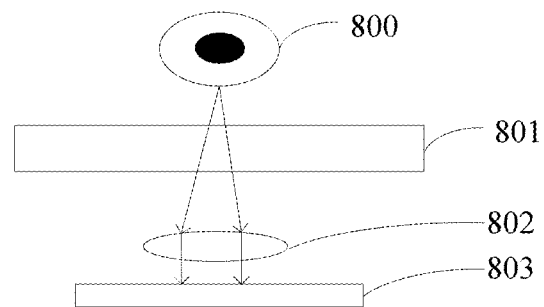
FIG. 8 is a schematic structural view of an image capturing apparatus in the prior art.

In conventional technologies, optical imaging has become a major trend for the imaging of objects in front of the screen. As shown in FIG. 8, a imaging module 803 is usually disposed at a certain distance below a display screen 801, and scattered light of an object 800 is imaged onto the imaging module 803 through the display screen 801 and a lens 802.

However, in existing terminal screen structure, the image capturing apparatus has a relatively large overall thickness and a relatively large volume, and thus has a limited application range.

Another embodiment of the present disclosure provides an image capturing apparatus. The image capturing apparatus includes: a light source module; a sensor component, wherein the sensor component has a first surface and a second surface opposite to each other, and the first surface of the sensor component is disposed opposite to the light source module; and an optical element disposed opposite to the second surface of the sensor component. Light emitted from the light source module is scattered by an object to be captured to the optical element, and is reflected by the optical element and received by the second surface of the sensor component. The second surface of the sensor component is a photosensitive surface. The second surface of the sensor component is suitable for receiving the light scattered by the object to be captured, and performing photoelectric conversion so as to achieve image capturing, without using additional camera devices. Further, with the reflecting and refracting of an optical path between the optical element and the sensor component, the thickness of the apparatus is reduced by about half, thereby reducing the cost.

Figure 9:
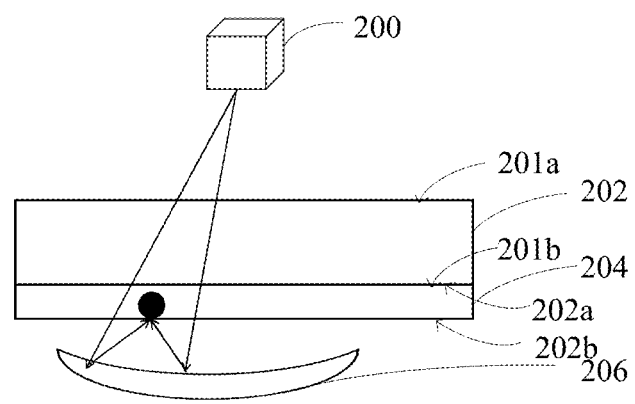
FIG. 9 is a schematic structural view of an image capturing apparatus according to an embodiment of the present disclosure.

FIG. 9 is a schematic structural view of an image capturing apparatus according to an embodiment of the present disclosure.

In some embodiments, the image capturing apparatus may include a light source module 202, a sensing module 204, and an optical element 206. Specifically, the optical element 206 may be a concave mirror.

The light source module has a first surface 201a and a second surface 201b opposite to each other. The sensing module 204 has a first surface 202a and a second surface 202b opposite to each other. The first surface 202a of the sensing module 204 is attached to the second surface 201b of the light source module 202, and the sensing module 204 is disposed below the second surface 201b of the light source module 202. The second surface 202b of the sensing module 204 is a photosensitive surface, and the concave mirror 206 is disposed below the sensing module 204. The light scattered by the object 200 to be captured is reflected by the concave mirror 206 and focused on the second surface 202b of the sensing module 204.

In some embodiments, the concave mirror 206 is a non-lens.

In some embodiments, the object to be captured may be a fingerprint, an eyeball, a finger and other parts that can operate the screen, or any other 3D objects that can be implemented, such as 3D face, which is not limited in the embodiments of the present disclosure.

In some embodiments, the first surface 202a of the sensing module 204 is attached to the second surface 201b of the light source module 202. "Attached" means that a distance between the first surface 202a of the sensing module 204 and the second surface 201b of the light source module 202 is 0 within an allowable error range.

In some embodiments, the sensing module 204 is disposed below the second surface 201b of the light source module 202, and "below" refers to a direction from the first surface 201a of the light source module 202 to the second surface 201b. The optical element 206 is disposed below the sensing module 204, and "below" refers to a direction from the first surface 202a of the sensing module 204 to the second surface 202b.

In other words, the image capturing apparatus includes the light source module 202, the sensing module 204 and the optical element 206 from top to bottom.

In some embodiments, the sensing module 204 may be used to obtain light and may include a plurality of photosensitive units (not shown).

In some embodiments, the light is transmitted through the light source module 202 and the sensing module 204, reflected by the optical element 206 and received by the photosensitive surface of the sensing module 204.

In some embodiments, the second surface 202b of the sensing module 204 is a photosensitive surface, and the scattered light of the object 200 to be captured can be reflected by the optical element 206 and focused on the photosensitive surface of the sensing module 204 so as to be imaged on the photosensitive surface of the sensing module 204, without using additional camera devices. Further, with the reflecting and refracting of an optical path between the optical element and the sensor component, the thickness of the apparatus is reduced by about half, thereby reducing the cost.

In some embodiments, the light source module 202 may include organic light-emitting diode (OLED) display pixels, and the sensing module 204 may include photo-diode pixels.

In a non-limiting embodiment, the object 200 to be captured above the light source module 202 may be imaged by the optical element 206 onto the sensing module 204 according to geometrical optical principle.

For related technical principles of geometric imaging principle, please refer to the conventional technologies, which is not limited in the embodiments of the present disclosure.

In a non-limiting embodiment, the first surface 202a of the sensing module 204 and the second surface 201b of the light source module 202 may be directly bonded by optical adhesive.

In a non-limiting embodiment, the object 200 to be captured is not in contact with the light source module 202.

In some embodiments, the object 200 to be captured may be not in contact with the light source module 202 so as to realize far-field imaging.

In some embodiments, a partial area of the first surface 202a of the sensing module 204 is provided with a light-shielding layer (not shown in the figure), and the light-shielding layer is opaque. The scattered light of the object 200 to be captured is incident on the optical element 206 through a light-transmitting area (i.e., the area without the light-shielding layer) of the first surface 202a of the sensing module 204, and the light source module 202 is disposed on the light-shielding layer. In some embodiments, the area without the light-shielding layer is the light-transmitting layer, and the light-transmitting layer is a non-air layer. For example, the refractive index of the light-transmitting layer is close to the refractive index of the light source module 202 and the sensing module 204. Specifically, the light-shielding layer may be an electrode, for example, a display pixel electrode of the light source module 202 or a photosensitive pixel electrode of the sensing module 204. In some embodiments, the light-shielding layer is a photosensitive pixel electrode of the sensing module 204, and the light source module 202 is directly attached to the light-shielding layer. In some embodiments, the light-shielding layer includes a plurality of light-shielding portions, and an area between each two adjacent light-shielding portions is the light-transmitting area. Each light-shielding portion is correspondingly disposed above each photosensitive pixel, and an area of each light-shielding portion is greater than or equal to an area of each photosensitive pixel of the sensing module 204.

Figure 10:
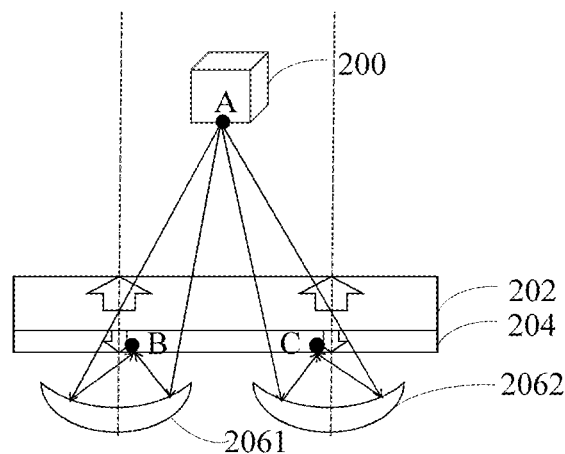
FIG. 10 is a schematic structural view of an image capturing apparatus according to another embodiment of the present disclosure.

Referring to FIG. 10, compared with the image capturing apparatus shown in FIG. 9, two optical elements are provided in the image capturing apparatus shown in FIG. 10, namely, a first optical element 2061 and a second optical element 2062. The first optical element 2061 and the second optical element 2062 are disposed in parallel below the sensing module 204.

In some embodiments, for a same point A on the object 200 to be captured, the scattered light may be transmitted through the light source module 202 and the sensing module 204, reflected by the first optical element 2061 and received by the photosensitive surface of the sensing module 204, thus an imaging point is formed at position B. The scattered light may also be transmitted through the light source module 202 and the sensing module 204, reflected by the second optical element 2062 and received by the photosensitive surface of the sensing module 204, thus an imaging point is formed at position C.

In some embodiments, the first optical element 2061 and the second optical element 2062 are concave mirrors to focus the light onto the second surface 202b of the sensing module 204.

In some embodiments, by setting two optical elements, the image of the object 200 to be captured can be formed at different positions of the sensing module 204 with a certain distance, so as to form a three-dimensional image and position the object 200 to be captured.

In the image capturing apparatus shown in FIG. 10, the light source module 202 and the sensing module 204 may be integrally formed, that is, the light source module 202 and the sensing module 204 may be formed as an in-cell structure.

In some embodiments, a partial area of the first surface of the sensing module 204 is provided with a light-shielding layer (not shown), and the light-shielding layer is opaque. The scattered light of the object 200 to be captured is incident on the optical element 206 through a light-transmitting area (i.e., the area without the light-shielding layer) of the first surface 202a of the sensing module 204, and the light source module 202 is disposed on the light-shielding layer. In some embodiments, the area without the light-shielding layer is the light-transmitting layer, and the light-transmitting layer is a non-air layer. For example, the refractive index of the light-transmitting layer is close to the refractive index of the light source module 202 and the sensing module 204. Specifically, the light-shielding layer may be an electrode, and the light source module 202 is directly attached to the light-shielding layer.

Figure 11:
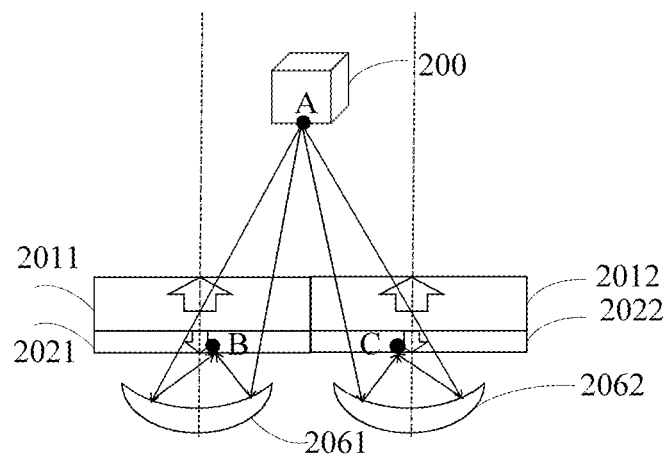
FIG. 11 is a schematic structural view of an image capturing apparatus according to still another embodiment of the present disclosure.

The image capturing apparatus shown in FIG. 11 differs from the image capturing apparatus shown in FIG. 10 in that, the light source module includes a first light source area 2011 and a second light source area 2012, and the sensor component includes a first sensor area 2021 and a second sensor area 2022. The first sensor area 2021 is located below the first light source area 2011, and the second sensor area 2022 is located below the second light source area 2012. The first optical element 2061 is located below the first sensor area 2021, and the second optical element 2062 is located below the second sensor area 2022.

It should be noted that an equal area in some embodiments of the present disclosure means that two areas are equal within the allowable error range.

In some embodiments, the object 200 to be captured may be imaged in the first sensor area 2021 by the first optical element 2061 according to the geometric imaging principle, and the object 200 to be captured may be imaged in the second sensor area 2022 by the second optical element 2062 according to the geometric imaging principle.

In some embodiments, the first optical element 2061 and the second optical element 2062 may be concave mirrors.

Figure 12:
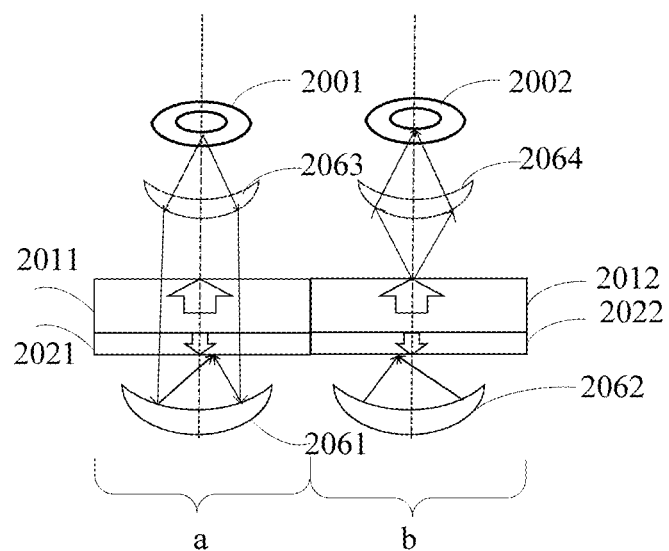
FIG. 12 is a schematic structural view of an image capturing apparatus according to yet another embodiment of the present disclosure.

Further, referring to FIG. 12, the image capturing apparatus may also include a third optical element 2063 and a fourth optical element 2064. The third optical element and the fourth optical element are disposed above the light source module 202. The light scattered by an object 2001 to be captured is refracted by the third optical element 2063, transmitted through the light source module 202 and the sensing module 204, and reaches a reflecting surface of the first optical element 2061. The light scattered by an object 2002 to be captured is refracted by the fourth optical element 2064, transmitted through the light source module 202 and the sensing module 204, and reaches a reflecting surface of the second optical element 2062.

Specifically, the light scattered by the object 2001 to be captured is refracted by the third optical element 2063, transmitted through a gap between the photosensitive pixels in the light source module 202 and the sensing module 204, and reaches the reflecting surface of the first optical element 2061, and the light scattered by the object 2002 to be captured is refracted by the fourth optical element 2064, transmitted through the gap between the photosensitive pixels of the light source module 202 and the sensing module 2042, and reaches the reflecting surface of the second optical element 2062.

In some embodiments, the third optical element 2063 and the fourth optical element 2064 may be convex lenses. Imaging the display screen in the eyes can obtain a sense of immersion. In VR/AR application scenarios, the third optical element 2063 and the fourth optical element 2064 may be spectacle lenses to project the display screen to the eyes.

In some embodiments of the present disclosure, by setting the third optical element and the fourth optical element, the object to be captured can be imaged on the photosensitive surface of the sensor component when the distance between the object to be captured and the light source component is relatively small.

In a specific application scenario, the image capturing apparatus can be used for augmented reality (AR), virtual reality (VR), mixed reality (MR) and other apparatuses, such as head display equipment, VR glasses, etc. Specifically, referring to FIG. 12, the light shown in an area a of FIG. 12 shows a schematic view of light for imaging the eyeball 2001, that is, positioning the eyeball 2001, and the light shown in an area b of FIG. 12 shows a schematic view of light when the eyeball 2001 views the display image of the light source module. For example, eye movement can be used, combined with display content, to drive a mouse and other signs to achieve interaction, so as to achieve screen display and screen perception at the same time. No additional camera is needed, and device thickness and cost can be reduced. The tracking of the eyeball in area a can be used for rendering the image according to the position of the eyeball, only high-definition calculation is done in specific area corresponding to the eyeball, and definition is reduced in other areas, thereby improving the overall operation performance.

In some embodiments, the light source module 201 may be a display panel, such as a liquid crystal display screen, an active array organic light emitting diode display screen, or a micro light emitting diode display screen.

In some embodiments, the position of the object to be captured may be determined by positions of two imaging points of the object to be captured on the sensing module 204 and the incident angle of the scattered light of the object to be captured. Therefore, when the object to be captured is the eyeball, the image capturing apparatus can realize the positioning and tracking of the eyeball, so that image rendering can be performed for the eyeball, only high-definition calculation is done in specific area corresponding to the eyeball, and definition is reduced in other areas, thereby improving the overall operation performance.

Furthermore, in VR/AR/MR scenes, since eye movement can reflect user's response to the content, the eye movement may be used, combined with the display content of the display structure, to drive the mouse and other signs to achieve interaction. Through the corresponding relationship between the eye movement and the display content, the pertinence of the display content is enhanced.

In another specific application scenario, the object to be captured may also be user's hand, so that the user's gesture movement may be used, combined with the display content of the display structure, to drive the mouse and other signs to achieve interaction.

Another embodiment of the present disclosure also provides an electronic equipment. The electronic equipment may include the image capturing apparatus shown in FIGS. 9 to 12, and a processor coupled with the image capturing apparatus. The process is suitable for receiving the image of the object 200 to be captured by the image capturing apparatus.

Figure 13:
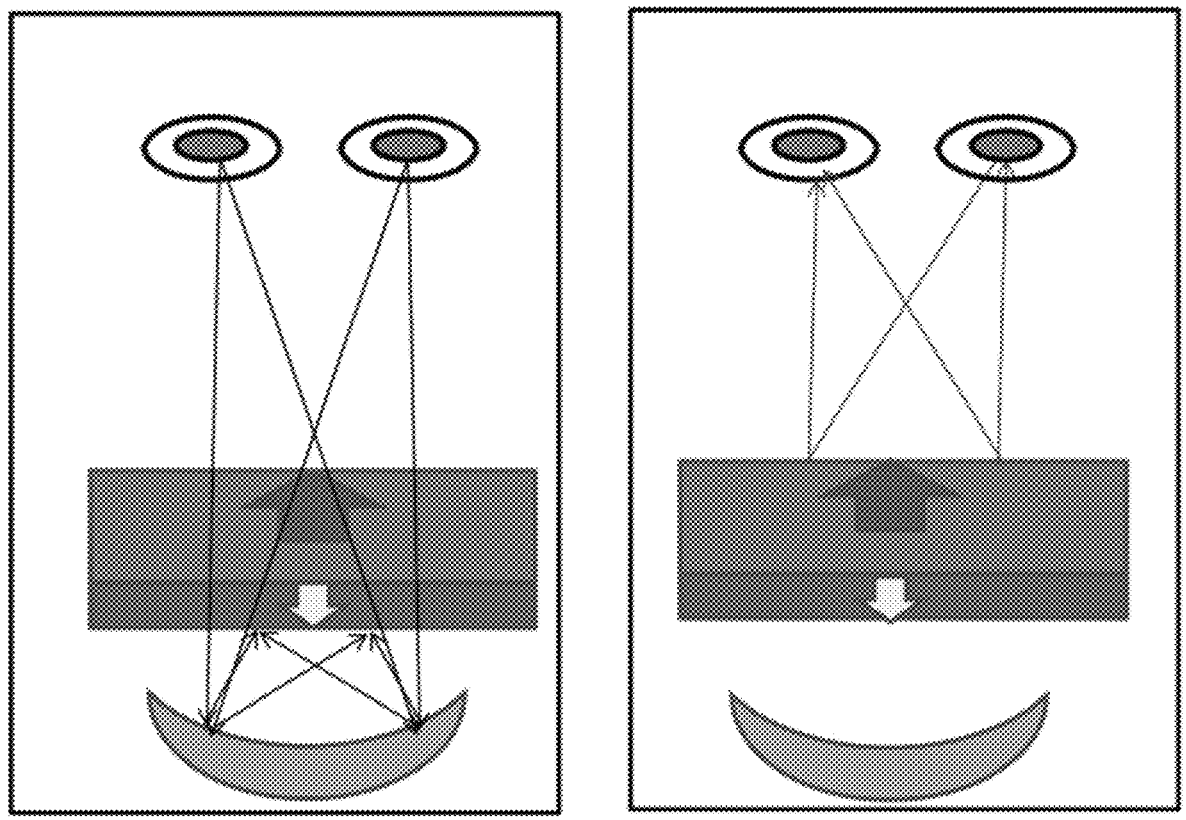
FIG. 13 is a schematic structural view of an image capturing apparatus according to still another embodiment of the present disclosure.

FIG. 13 is a schematic view of an image capturing apparatus according to still another embodiment of the present disclosure. A left figure shows imaging of two eyeballs, and a right figure shows imaging results of the two eyeballs in the left figure, so as to provide specific display for two eyeballs to view. This embodiment illustrates a scheme of using eye movement to control the display, using the eye movement, combined with the display content, to drive the mouse and other signs to achieve interaction. The eyeballs can track people's reactions to content. At data application level, through the corresponding relationship between the eye movement and the display content, the pertinence of the display content is enhanced. This embodiment can realize the screen display and the screen perception at the same time, without additional cameras, thereby reducing the apparatus thickness and reducing the cost.

Figure 14:
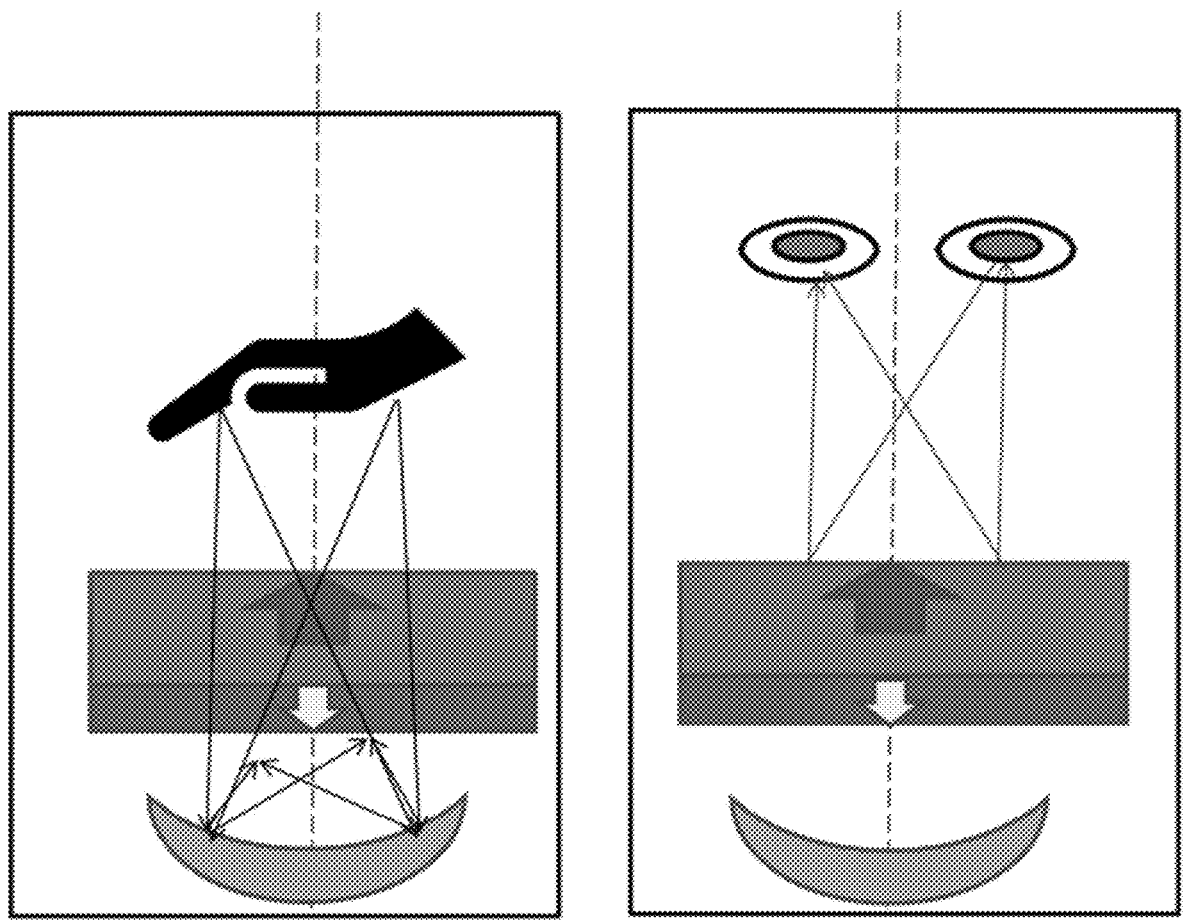
FIG. 14 is a schematic structural view of an image capturing apparatus according to yet another embodiment of the present disclosure.

FIG. 14 is a schematic view of an image capturing apparatus according to yet another embodiment of the present disclosure. A left figure shows the imaging of a gesture, and the right figure shows imaging result of the gesture according to the left figure, so as to provide specific display for two eyeballs to view. This embodiment is a gesture control system, using gesture movement, combined with the display content, to drive the mouse and other signs to achieve interaction. This embodiment can realize the screen display and the screen perception at the same time, without additional cameras, thereby reducing the apparatus thickness and reducing the cost.

When collecting light, the existing image capturing apparatus is prone to be interfered by the ambient light, and the light of the ambient light is greatly absorbed, which affects the absorption of OLED signal light by the image capturing apparatus, and finally affects the definition of fingerprint image.

In view of above problem, another embodiment of the present disclosure provides an image capturing apparatus. In the image capturing apparatus, by setting a third incident light (signal light) with the critical angle of total reflection as the incident angle radiated to the corresponding first light-transmitting portion along the edge of the second light-shielding portion, when the third incident light intersects with the corresponding first light-transmitting portion, an intersection point is located at the edge of the corresponding first light-transmitting portion or outside the corresponding first light-transmitting portion, so that most of the refracted light of the ambient light may be incident outside the first light-transmitting portion. Therefore, the light detecting structure can suppress all the ambient light and improve the clarity of the fingerprint image.

Figure 15:
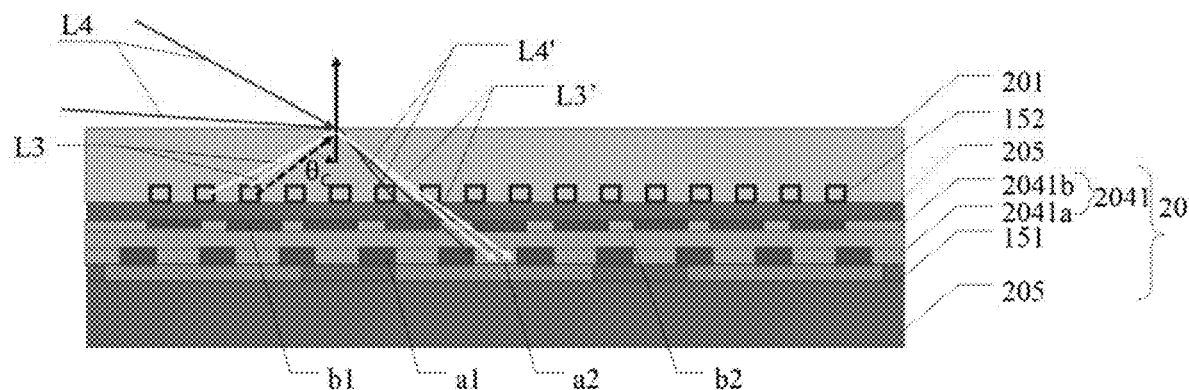
FIG. 15 is a schematic cross-sectional view of a fingerprint module according to an embodiment of the present disclosure.

Specifically, referring to FIG. 15, another embodiment of the present disclosure provides an image capturing apparatus, wherein the catadioptric component, the photosensitive pixel array 151 above the catadioptric component and the mask layer 2041 above the photosensitive pixel array 151 constitute the light detecting structure.

More specifically, the substrate 205, the photosensitive pixel array 151 above the substrate 205, and the mask layer 2041 above the photosensitive pixel array constitute the light detecting structure. The photosensitive pixel array 151 is disposed on the second surface of the sensor component 2042. The substrate 205, the photosensitive pixel array 151 and the mask layer 2041 are arranged successively from bottom to top.

In some embodiments, the light detecting structure 20 may include the substrate 205, the photosensitive pixel array 151 above the substrate 205, and the mask layer 2041 above the photosensitive pixel array 151 arranged successively from bottom to top.

The mask layer 2041 includes a first mask layer 2041a above the photosensitive pixel array 151 and a second mask layer 2041b above the first mask layer 2041a arranged successively from bottom to top.

The first mask layer 2041a may include: a plurality of first light-shielding portions a1, and a first light-transmitting portion a2 is disposed in adjacent first light-shielding portions a1.

The second mask layer 2041b may include: a plurality of second light-shielding portions b1, and a second light-transmitting portion b2 is disposed between adjacent second light-shielding portions b1. The second light-shielding portions b1 correspond to the first light-transmitting portions a2 respectively, and each second light-shielding portions b1 is located above a corresponding first light-transmitting portion a2.

In some embodiments, the light source module 202 includes an OLED display structure. The OLED display structure is disposed above the light detecting structure 20.

In some embodiments, the OLED display structure includes: an OLED array 152 disposed above the substrate.

The OLED array 152 includes a plurality of OLEDs arranged in an array. The OLEDs can emit light by themselves. The cover plate 201 is usually a transparent glass cover plate, and the user can input a fingerprint on the cover plate 201. When an electric current flows through the OLED array 152, the pixel structure in the OLED array 152 will emit signal light, and light L3 of the signal light will radiate the cover plate 201 to generate a corresponding reflected light L3'. The reflected light L3' is collected by the light detecting structure 20 below the OLED display structure to form a fingerprint image.

In some embodiments, in addition to the signal light, light L4 of the ambient light will also radiate the cover plate 201 and generate a corresponding refracted light L4'. The refracted light L4' of the ambient light is also collected by the light detecting structure 20. Because the intensity of the refracted light L4' of the ambient light is usually strong, it will affect the color saturation of the fingerprint image formed by the light detecting structure 20, and then affect the clarity of the fingerprint image.

In some embodiments, the refracted light of the ambient light radiates the first mask layer 2041a through the second light-transmitting portion b2, and is shielded by the first light-shielding portion a1. The signal light emitted from the OLED array 152 is incident on the first mask layer 2041a through the gap between adjacent second light-shielding portions b1, i.e., the second light-transmitting portion b2, transmitted through the first light-transmitting portion a2 of the first mask layer 2041a and received by the photosensitive pixel array 151.

The photosensitive pixel array 151 may include a plurality of photodiodes arranged in an array. The photodiodes can convert optical signal collected by the first light-transmitting portion a2 into electrical signal to complete subsequent fingerprint identification.

In some embodiments, the first light-transmitting portion a2 and the second light-transmitting portion b2 may be openings or made of a light-transmitting material.

In some embodiments, the number of the first light-transmitting portions a2 in the first light-shielding portions a1 is not limited, and can be set according to actual requirements. The first light-transmitting portions a2 in the first light-shielding portions a1 can have any shape. The first light-shielding portions a1 is used as a frame of the first light-transmitting portions a2, and can match the shape of the first light-transmitting portions a2.

In some embodiments, the number and shape of the second light-shielding portions b1 on the second mask layer 2041b are not limited, and can be set according to actual requirements. The shape of the second light-transmitting portions b2 between adjacent second light-shielding portions b1 may match the shape of the second light-shielding portions b1.

In some embodiments, the OLED array 152 has a size of about 50 and the light detecting structure 20 has a size of about 100 μm. The first mask layer 2041a and the second mask layer 2041b have a size of about a few microns. Therefore, on the light detecting structure 20, there will be hundreds of second light-shielding portions b1 and first light-transmitting portions a2. The second light-shielding portions b1 and the first light-transmitting portions a2 are aligned with each other in up-down direction.

Figure 16:
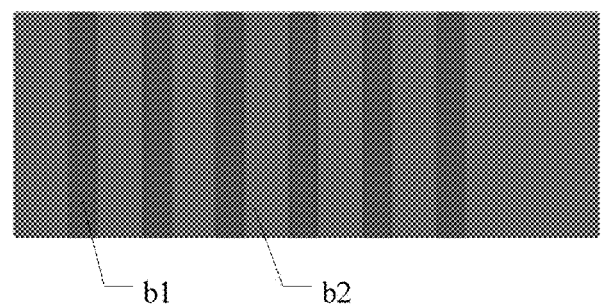
FIG. 16 is a schematic view showing an arrangement of a second light-shielding portion according to an embodiment of the present disclosure.
Figure 17:
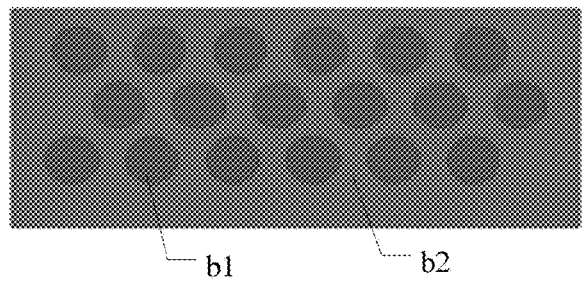
FIG. 17 is a schematic view showing an arrangement of a second light-shielding portion according to another embodiment of the present disclosure.

In some embodiments of the present disclosure, as shown in FIG. 16, a plurality of second light-shielding portions b1 may be arranged in a strip array. As shown in FIG. 17, a plurality of second light-shielding portions b1 may also be arranged in a hexagonal array. The first mask layer 2041a and the second mask layer 2041b may be symmetrical more uniformly in all directions by arranging the plurality of second light-shielding portions b1 according to the strip array or hexagon array, thereby enabling fingerprint module to select an asymmetric light source and enhancing the user experience. Accordingly, there is only one corresponding first light-transmitting portion a2 below each second light-transmitting portion b1. The first light-transmitting portions a2 may be changed according to the arrangement shape of the second light-shielding portions b1.

Figure 18:
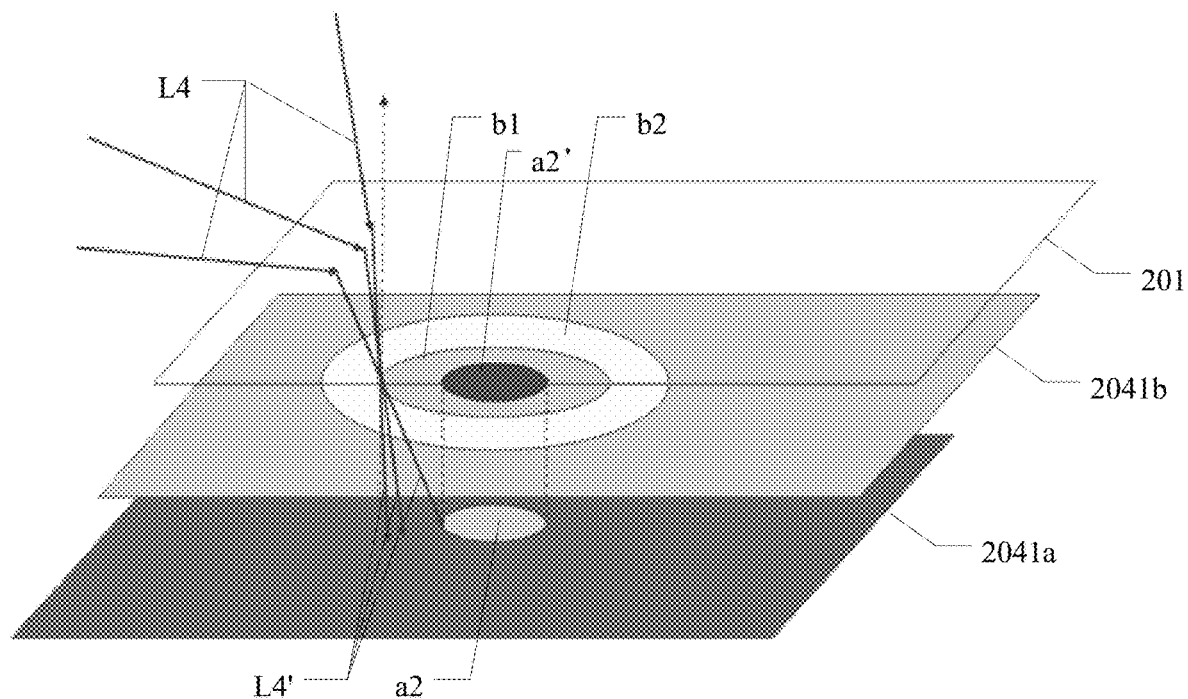
FIG. 18 is a schematic structural view showing a correspondence relationship between a single first light-transmitting portion and a second mask layer according to an embodiment of the present disclosure.

In some embodiments of the present disclosure, referring to FIG. 18, in order to improve the symmetry of the light detecting structure 20 and improve the light efficiency of the fingerprint module as much as possible, the second light-shielding portions b1 and the first light-transmitting portions a2 are circular-shaped, and the second light-transmitting portions b2 may be annular-shaped. Moreover, a connecting line between a center of circle of each second light-shielding portion b1 and a center of circle of corresponding first light-transmitting portion a2 is perpendicular to a plane where the second light-shielding portion b1 and the corresponding first light-transmitting portion a2 are located.

In some embodiments of the present disclosure, for the convenience of description, provided that the OLED display structure and the light detecting structure 20 have a same refractive index.

In some embodiments, referring to FIG. 18, after the light L4 of the ambient light radiates the cover plate 201, a corresponding refracted light L4' may be incident on the first light-shielding portion a1 or the first light-transmitting portion a2 through the second light-transmitting portion b2 of the second mask layer 2041b. Since the light detecting structure 20 forms the fingerprint image based on the light collected in the first light-transmitting portion a2, the clarity of the formed fingerprint image will be affected when the refracted light L4' of the ambient light is incident on the first light-transmitting portion a2.

In order to reduce the influence of the ambient light on the clarity of the fingerprint image, in some embodiments of the present disclosure, the third incident light is set to radiate the corresponding first light-transmitting portion a2 along the edge of the second light-shielding portion b1 with the critical angle of total reflection $\theta_C$ as the incident angle. When intersecting with the corresponding first light-transmitting portion a2, an intersection point is located on the edge of the corresponding first light-transmitting portion or outside the corresponding first light-transmitting portion a2.

In some embodiments, due to the low refractive index of the air, when the refracted light L4' of the ambient light radiates the first mask layer 2041a, the incident angle is less than or equal to the critical angle $\theta_C$ of total reflection. Therefore, by setting the intersection point between the third incident light and the corresponding first light-transmitting portion a2 on the edge of the corresponding first light-transmitting portion or outside the corresponding first light-transmitting portion a2, it can be ensured that the refracted light L4' of the ambient light does not intersect with the corresponding first light-transmitting portion a2, and then the corresponding first light-transmitting portion a2 will not collect the refracted light L4' of the ambient light, thereby avoiding the influence of the ambient light on the definition of fingerprint image.

In a specific implementation, various methods can be adopted to set the intersection point between the third incident light and the corresponding first light-transmitting portion a2 on the edge of the corresponding first light-transmitting portion or outside the corresponding first light-transmitting portion a2, which is not limited herein. For example, only the size of the first light-transmitting portion a2 is reduced, or only the size of the second light-shielding portion b1 is increased. Of course, the size of the first light-transmitting portion a2 is reduced while the size of the second light-shielding portion b1 is increased. No matter what method is adopted, as long as the intersection point between the third incident light and the corresponding first light-transmitting portion a2 is located on the edge of the corresponding first light-transmitting portion or outside the corresponding first light-transmitting portion a2, this method will fall within the protection scope of the present disclosure.

Figure 19:
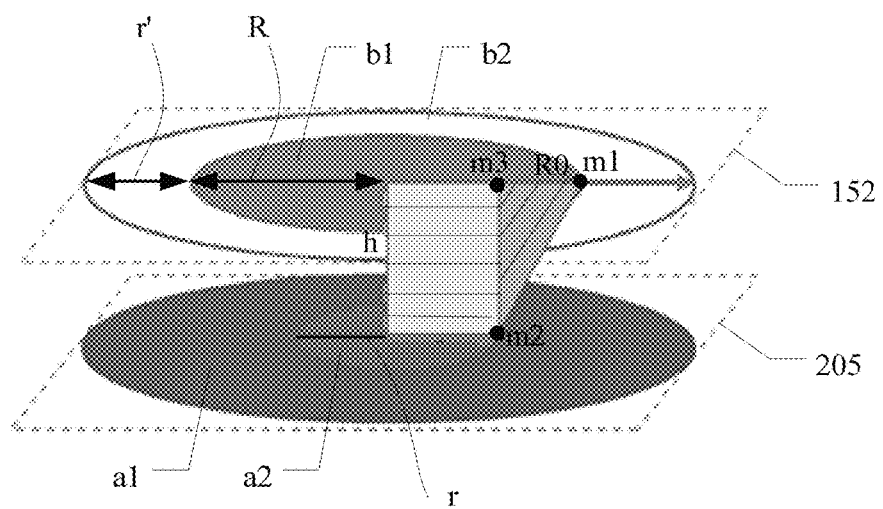
FIG. 19 is a schematic structural view showing a correspondence relationship between a single first light-transmitting portion and a second mask layer according to another embodiment of the present disclosure.

Referring to FIG. 19, ▤ represents an area of a projection of the first light-transmitting portion a2 on the second light-shielding portion b1, and ▨ represents an area of the second light-shielding portion b1 projecting beyond the edge of the first light-transmitting portion a2.

In some embodiments of the present disclosure, referring to FIG. 19, in order to set the intersection point between the third incident light and the corresponding first light-transmitting portion a2 on the edge of the corresponding first light-transmitting portion a2 or outside the corresponding first light-transmitting portion a2, a radius R0 of a projection of the second light-shielding portion b1 on the first mask layer 2041a is less than or equal to the tangent value of $\theta_C$ and the thickness value h of the mask layer 2041.

In some embodiments, the radius of the projection of the second light-shielding portion b1 on the first mask layer 2041a is a length of a connecting line between an intersection point m1 between the third incident light and the edge of the second light-shielding portion b1, and a projection point m3 of the intersection point m2 between the third incident light and the corresponding first light-transmitting portion a2 on the second light-shielding portion.

A maximum value of a length R0 of the connecting line between point m1 and point m3 is h*tan $\theta_C$, that is, once the third incident light intersects with the corresponding first light-transmitting portion a2, the intersection point can only be located on the edge of the corresponding first light-transmitting portion a2. At this time, the light having an incident angle less than the critical angle $\theta_C$ of total reflection is all located outside the corresponding first light-transmitting portion a2.

For example, the second light-shielding portion b1 and the first light-transmitting portion a2 are both circular-shaped, and the connecting line between the center of circle of the second light-shielding portion b1 and the center of circle of corresponding first light-transmitting portion a2 is perpendicular to the plane where the second light-shielding portion b1 and the corresponding first light-transmitting portion a2 are located. In some embodiments of the present disclosure, the difference R0 between the radius R of the second light-shielding portion b1 and the radius r of the corresponding first light-transmitting portion a2 can be set to be equal to the product of the tangent value of the critical angle $\theta_C$ of total reflection times the thickness value h of the mask layer.

It can be seen that the length R0 of the connecting line between point m1 and point m3 is not only related to the radius r of the first light-transmitting portion a2 and the radius r of the second light-shielding portion b1, but also related to the thickness value h of the mask layer and the critical angle $\theta_C$ of total reflection. Therefore, the length R0 can be adjusted by adjusting R, r, h and $\theta_C$. The length R0 of the connecting line between point m1 and point m3 can be adjusted based on the requirements for area utilization rate of the light detecting structure 20.

For example, the cover plate is glass. Since the refractive index of the glass is 1.5, the critical angle $\theta_C$ of total reflection=41.8.

Referring to FIG. 19, in some embodiments of the present disclosure, the radius of the first light-transmitting portion a2 is r, the radius of the second light-shielding portion b1 is R=2r, a radial width of the second light-transmitting portion b2 is r', the thickness of the mask layer is h=(R+r)*tan ($\theta_C$)≈r. In some embodiments, r'=r, and the area utilization rate of the light detecting structure 20=$\pi$*$r^2$/$\pi$ $(R+r')^2$=$r^2$/$(R+r')^2$=1/9.

In the embodiment shown in FIG. 19, when the light of the ambient light radiates the cover plate 201 at an incident angle in the range of 45° to 71°, the incident angle of the corresponding refracted light irradiating the first mask layer 2041a is less than or equal to the critical angle $\theta_C$ of total reflection. At this time, the refracted light is incident outside the first light-transmitting portion a2.

In a specific implementation, the signal light L3 emitted from the OLED array 152 is reflected by the cover plate 201, and the incident angle of the corresponding reflected light L3' may be close to the critical angle of total reflection. If the reflected light L3' having an incident angle close to the critical angle of total reflection is not collected by the first light-transmitting portion a2, the light efficiency of the fingerprint module will be reduced.

Figure 20:
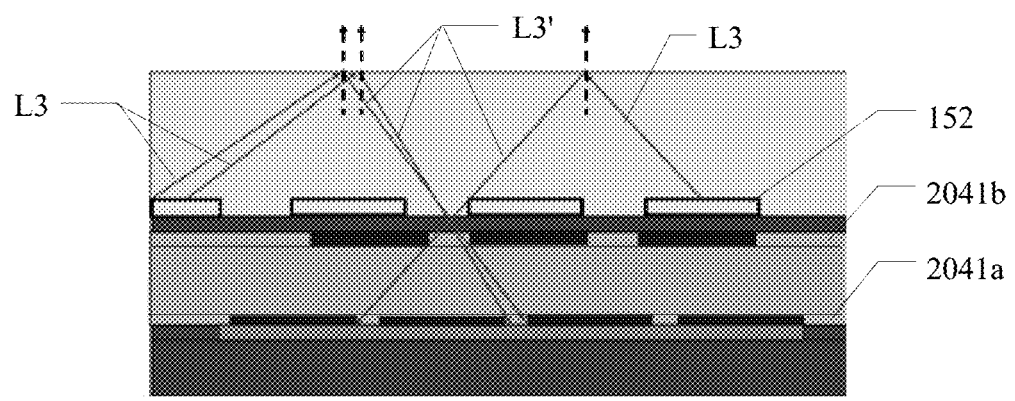
FIG. 20 is a schematic view of a route of a signal light.

In some embodiments of the present disclosure, referring to FIG. 20, the incident angle of the reflected light L3' on the first mask layer 2041a can be adjusted so that the incident angle of the reflected light L3' on the first mask layer 2041a is greater than the critical angle of total reflection. In this way, the signal light emitted from the OLED array 152 will be collected by the first light-transmitting portion a2, thereby effectively improving the light efficiency of the fingerprint module.

Figure 21:
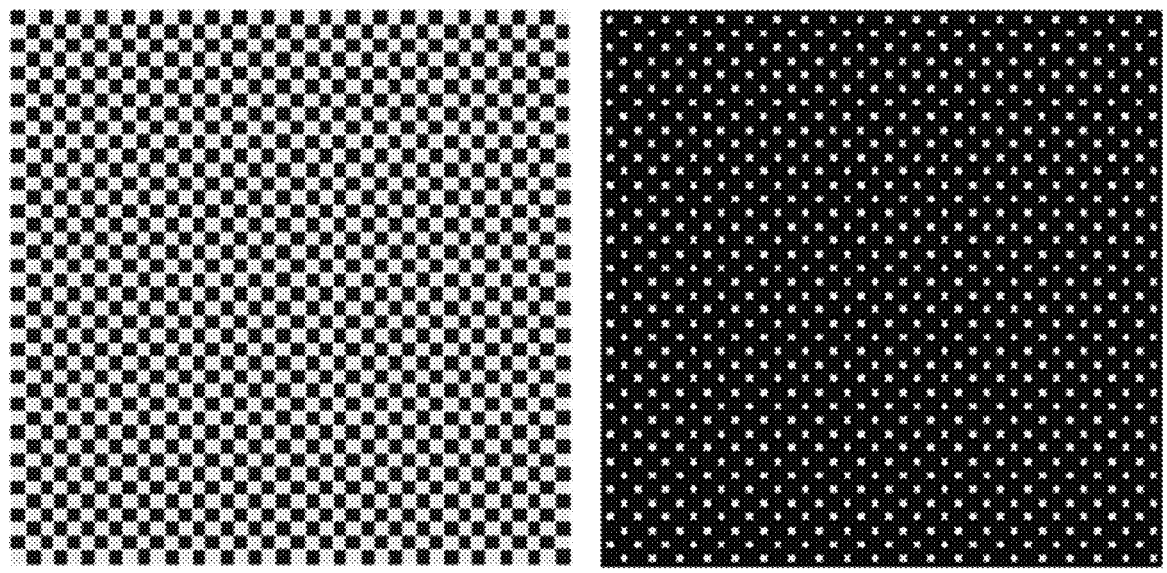
FIG. 21 is a schematic view showing patterns of a first light-shielding portion a1 and a second light-shielding portion b1 according to an embodiment of the present disclosure.

FIG. 21 is a schematic view showing patterns of the first light-shielding portion a1 (a black area in a right figure) and the second light-shielding portion b1 (a black area in a left figure) according to an embodiment of the present disclosure. The total area of the first light-transmitting portions between adjacent first light-shielding portions a1 is 80% of the total area of the second light-transmitting portion between adjacent second light-shielding portions b1.

In some embodiments, the area of each first light-shielding portion a1 is greater than the area of the corresponding second light-transmitting portion. Specifically, a side length of the first light-transmitting portion may be 0.7~0.99 of a side length of the second light-shielding portion b1, for example, 0.8 or 0.9.

Figure 22:
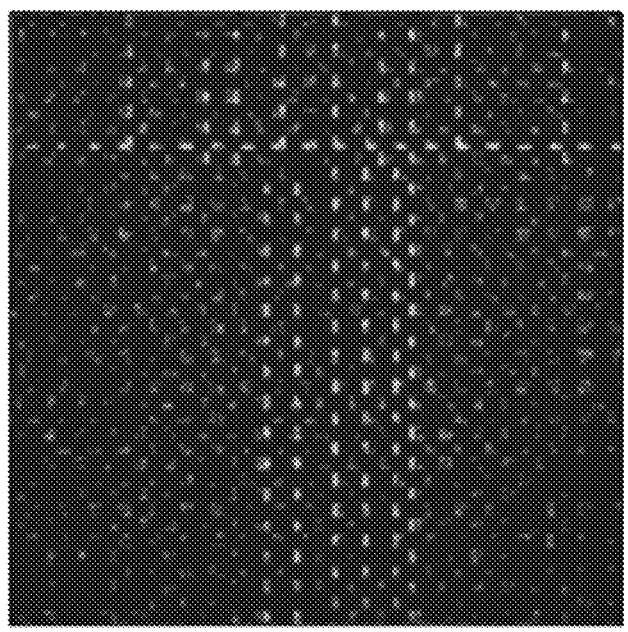
FIG. 22 is a schematic view showing light intensity distribution of ambient light measured by a light detecting structure according to an embodiment of the present disclosure.
Figure 22:
Figure 23:
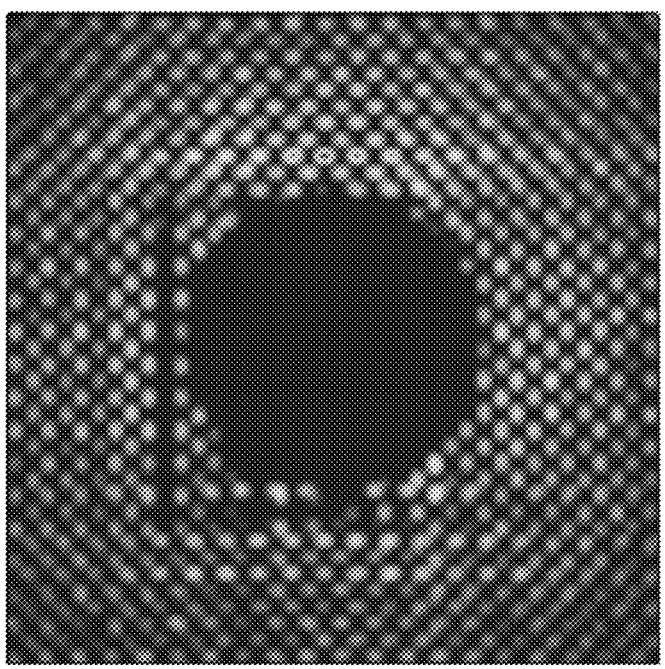
FIG. 23 is a schematic view showing light intensity distribution of signal light measured by a light detecting structure according to an embodiment of the present disclosure.
Figure 23:

FIG. 22 shows light intensity distribution of the ambient light measured by the light detecting structure according to embodiments of the present disclosure, and FIG. 23 shows light intensity distribution of the signal light measured by the light detecting structure according to embodiments of the present disclosure. It can be clearly seen that the ambient light is suppressed and the signal light is enhanced.

Another embodiment of the present disclosure also provides a terminal. The terminal includes any one of the above-mentioned image capturing apparatuses. The user can input fingerprint on the cover plate 201 of the image capturing apparatuses and the fingerprint information is collected by the fingerprint module to complete the identification.

In some embodiments of the present disclosure, the terminal includes, but is not limited to, a mobile phone, a notebook, a tablet computer, and an in-vehicle computer. It can be understood that specific device of the terminal does not constitute a limitation to the present disclosure, and is within the protection scope of the present disclosure.

Although the present disclosure has been disclosed above, the present disclosure is not limited thereto. Any changes and modifications may be made by those skilled in the art without departing from the spirit and scope of the present disclosure, and the scope of the present disclosure should be determined by the appended claims.

The invention claimed is:

1. An image capturing apparatus, comprising:
   a light-transmitting cover plate;
   a light source module disposed below a first surface of the light-transmitting cover plate;
   at least one sensing module comprising a mask layer and a sensor component, wherein the sensor component has a first surface and a second surface opposite to each other, the first surface of the sensor component is disposed opposite to the mask layer and the second surface of the sensor component is a photosensitive surface, and the mask layer is made of an opaque material;
   a catadioptric component having a first surface and a second surface opposite to each other, wherein the sensor component is disposed on the first surface of the catadioptric component;
   wherein a first incident light generated by the light source module is reflected to the second surface of the catadioptric component by the first surface of the light-transmitting cover plate, refracted and reflected on the second surface of the catadioptric component, and received by the second surface of the sensor component;

wherein the second surface of the sensor component includes a photosensitive pixel array;

wherein the catadioptric component, the photosensitive pixel array above the catadioptric component, and the mask layer above the photosensitive pixel array constitute a light detecting structure;

the mask layer in the light detecting structure comprises a first mask layer above the photosensitive pixel array and a second mask layer above the first mask layer from bottom to top;

the first mask layer comprises a plurality of first light-shielding portions, and a first light-transmitting portion is disposed between adjacent first light-shielding portions; and the second mask layer comprises a plurality of second light-shielding portions, and a second light-transmitting portion is disposed between adjacent second light-shielding portions;

wherein there is a one-to-one correspondence between the plurality of second light-shielding portions and the first light-transmitting portion, and each second light-shielding portion is disposed above a corresponding first light-transmitting portion.

2. The image capturing apparatus according to claim 1, wherein an incident angle of the first incident light on the first surface of the light-transmitting cover plate is greater than a critical angle of total reflection.

3. The image capturing apparatus according to claim 1, wherein a portion of a second incident light generated by the light source module, which is reflected by the first surface of the light-transmitting cover plate, is transmitted through the second surface of the catadioptric component or shielded by the mask layer, and an incident angle of the second incident light on the first surface of the light-transmitting cover plate is less than a critical angle of total reflection.

4. The image capturing apparatus according to claim 1, wherein an ambient light, which is transmitted through the light-transmitting cover plate, is transmitted through the second surface of the catadioptric component or shielded by the mask layer.

5. The image capturing apparatus according to claim 1, further comprising:
a protective layer disposed below the light source module.

6. The image capturing apparatus according to claim 1, wherein the image capturing apparatus comprises a plurality of discrete sensing modules, an opening is disposed in an area between each two adjacent sensing modules, or an area between each two adjacent sensing modules is light-transmitting.

7. The image capturing apparatus according to claim 1, wherein an area of the mask layer in each sensing module is greater than or equal to an area of the sensor component.

8. The image capturing apparatus according to claim 1, wherein the catadioptric component comprises a substrate.

9. The image capturing apparatus according to claim 8, wherein the catadioptric component further comprises:
an optical element disposed below the substrate;
wherein light scattered by an object to be captured reaches the optical element through an area between two adjacent sensing modules, and is reflected by the optical element and received by the second surface of the sensor component.

10. The image capturing apparatus according to claim 6, wherein the catadioptric component comprises:
an optical element disposed below the second surface of the sensor component;
wherein light scattered by an object to be captured reaches the optical element through an area between two adjacent sensing modules, and is reflected by the optical element and received by the second surface of the sensor component.

11. The image capturing apparatus according to claim 10, wherein the optical element comprises a first optical element and a second optical element, and the first optical element and the second optical element are disposed in parallel along a surface direction of the sensor component.

12. The image capturing apparatus according to claim 11, wherein the light source module comprises a first light source area and a second light source area, the sensor component comprises a first sensor area and a second sensor area, the first sensor area is disposed opposite to the first light source area, and the second sensor area is disposed opposite to the second light source area, the first optical element is disposed opposite to the first sensor area, and the second optical element is disposed opposite to the second sensor area.

13. The image capturing apparatus according to claim 11, further comprising:
a third optical element and a fourth optical element;
wherein the third optical element and the fourth optical element are disposed on one side of the light source module far away from the sensor component, the light scattered by the object to be captured reaches the first optical element through the third optical element, and the light scattered by the object to be captured reaches the second optical element through the fourth optical element.

14. The image capturing apparatus according to claim 10, wherein the optical element comprises a concave mirror, and the object to be captured above the light source module is imaged by the concave mirror onto the sensor component.

15. The image capturing apparatus according to claim 10, wherein the first surface of the sensor component is attached to the light source module.

16. The image capturing apparatus according to claim 10, wherein the object to be captured is not in contact with the light source module.

17. The image capturing apparatus according to claim 1, wherein the object to be captured comprises a fingerprint, an eyeball, a gesture, or a human face.

18. The image capturing apparatus according to claim 1, wherein the light source module comprises a display structure.

19. The image capturing apparatus according to claim 1, wherein a third incident light is radiated to the corresponding first light-transmitting portion along an edge of each second light-shielding portion with a critical angle of total reflection as an incident angle, and an intersection point is located on an edge of the corresponding first light-transmitting portion or outside the corresponding first light-transmitting portion when the third incident light intersects with the first mask layer.

20. The image capturing apparatus according to claim 19, wherein when the third incident light intersects with the first mask layer, a radius of a projection of each second light-shielding portion on the first mask layer is less than or equal to a product of a tangent value of the critical angle of total reflection and a thickness value of the mask layer.

21. The image capturing apparatus according to claim 20, wherein the second light-shielding portion and the first light-transmitting portion are both circular-shaped, and a connecting line between a center of circle of the second light-shielding portion and a center of circle of the corresponding first light-transmitting portion is perpendicular to a plane where the second light-shielding portion and the corresponding first light-transmitting portion are located.

22. The image capturing apparatus according to claim 21, wherein a difference between a radius of the second light-shielding portion and a radius of the corresponding first light-transmitting portion is equal to a product of the tangent value of the critical angle of total reflection and the thickness value of the mask layer.

23. The image capturing apparatus according to claim 1, wherein the plurality of second light-shielding portions are arranged in a hexagonal array or in a strip array.

24. The image capturing apparatus according to claim 19, wherein the light source module comprises an OLED display structure; and
   a signal light emitted by the OLED display structure comprises light having an incident angle on the first mask layer greater than the critical angle of total reflection.

25. The image capturing apparatus according to claim 1, wherein the mask layer comprises an electrode.

26. The image capturing apparatus according to claim 1, further comprising:
   a complementary metal oxide semiconductor device disposed below the substrate; and
   a lens disposed between the substrate and the complementary metal oxide semiconductor device, wherein light scattered by an object to be captured is transmitted through the lens and received by the complementary metal oxide semiconductor device.

27. The image capturing apparatus according to claim 1, wherein both the light source module and the at least one sensing module are attached to the second surface of the light-transmitting cover plate.

28. The image capturing apparatus according to claim 1, wherein the light-transmitting cover plate comprises a plurality of display pixels, and the light source module is disposed below the light-transmitting cover plate.

29. An electronic equipment, comprising the image capturing apparatus according to claim 1.

* * * * *